(12) United States Patent
Sato et al.

(10) Patent No.: US 6,956,571 B2
(45) Date of Patent: Oct. 18, 2005

(54) DISPLAY DEVICE AND DESIGN METHOD FOR DISPLAY DEVICE

(75) Inventors: Seiji Sato, Kanagawa (JP); Hidehiko Sekizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 10/169,645

(22) PCT Filed: Feb. 7, 2001

(86) PCT No.: PCT/JP01/00841

§ 371 (c)(1),
(2), (4) Date: Jul. 3, 2002

(87) PCT Pub. No.: WO01/59509

PCT Pub. Date: Aug. 16, 2001

(65) Prior Publication Data

US 2003/0001797 A1 Jan. 2, 2003

(30) Foreign Application Priority Data

Feb. 7, 2000 (JP) ........................ 2000-029595

(51) Int. Cl.$^7$ .............................................. G06T 15/50
(52) U.S. Cl. ..................................................... 345/426
(58) Field of Search ................................. 345/426, 418, 345/410, 407; 382/274, 165, 228

(56) References Cited

U.S. PATENT DOCUMENTS

| | | | | |
|---|---|---|---|---|
| 3,678,184 A | * | 7/1972 | Kurokawa | 348/260 |
| 2002/0118889 A1 | * | 8/2002 | Shimizu | 382/274 |
| 2003/0009889 A1 | * | 1/2003 | Goldberg | 33/1 K |

FOREIGN PATENT DOCUMENTS

| | | |
|---|---|---|
| JP | 09-113862 | 5/1997 |
| JP | 10-186273 | 7/1998 |

OTHER PUBLICATIONS

English translation of International Preliminary Examination Report, dated Feb. 6, 2002, from corresponding International Application No. PCT/JP01/00841.

* cited by examiner

*Primary Examiner*—Wilson Lee
*Assistant Examiner*—Huedung X. Cao
(74) *Attorney, Agent, or Firm*—Sonnenschein, Nath & Rosenthal LLP

(57) ABSTRACT

A display device having a liquid crystal display element (30) transmitting light projected from a light source to an watching point side, and including pixels (31) forming a first image region and a second image region, and an image separation filter (32) disposed from the pixels (31) through glasses (33, 34) each with a specified thickness and forming a first image separation mechanism and a second image separation mechanism, in which a calculation for obtaining the disposing interval (P1, P3) of each of the above-described image separation mechanisms of the image separation filter (32) is carried out on the basis of angles of elevation θk+1, θk, angles αk+1, αk, thicknesses W1, W2 and refractive index n of the glasses (33, 34), a distance D from the watching point to the display device, and an interval (P2) between the image regions of the above-described pixels (31) to dispose the image separation mechanisms of the above-described filter (32) with the obtained P1, P3.

13 Claims, 19 Drawing Sheets

P2 0.2805

| P2 | n |
|---|---|
| 0.2805 | 1.52 |

| W1,W2 | K |
|---|---|
| 1.0455 | 512 |

DISPLAY DEVICE AND DESIGN METHOD FOR DISPLAY DEVICE

TECHNICAL FIELD

The present invention relates to a display device and a method of designing a display device, to an image separation filter used for a display of a stereoscopic image with a binocular disparity or parallax or for a double view display that displays multi-views from one displayed image, and to a display system using the filter.

BACKGROUND OF THE INVENTION

There has been developed a system of displaying two or more mixed pictures on one display plane potentially having an image separation mechanism to take out each of given original images by the image separation mechanism. Such a system includes a method of separately presenting each of two images with binocular disparity between them to each of the right and left eyes in a two-dimensional image to reproduce a three-dimensional image, or a double-view display displaying multi-views from one displayed face, or the like.

In the image separation mechanism used in the above-described system, the mixed pictures are separated by adopting an image separation filter using linearly polarized light rays crossing at right angles, circularly polarized light rays, wavelengths different from each other (red and blue etc.), or the like. Although the above-described image separation filter can be formed in a pixel on the display plane, it is difficult to make such a filter. Thus, a method is often used in which the image separation filter is provided on the outside of an ordinary display element displaying a two-dimensional image.

Namely, there is known a method of, for example, affixing a half-wave plate for each line outside a polarizing plate (U.S. Pat. Nos. 5,264,964, 5,327,285, and 5,537,144) (SID91DIGEST 840).

In FIG. 20, there are shown cross sectional views of a display device capable of expressing a first image and a second image alternately on lines on one display plane when being watched. The FIG. 20 shows an example of a transparent type display device having a light source provided behind the display plane with arrows in the figure representing light beams watched by a watcher. In general, a pixel member 1 of a liquid crystal display element of an LCD is arranged to be put between transparent materials such as glasses 2a and 2b with an image separation filter 3 to be mounted at a specified distance apart from the pixel member 1 as shown in the figures.

The above-described pixel member 1 has an arrangement in which a first image region (a pixel region displaying the first image) $s_1$ and a second image region (a pixel region displaying the second image) $s_2$ are alternately formed, and the image separation filter 3 has an arrangement in which a first image separation mechanism $e_1$ and a second image separation mechanism $e_2$ are alternately formed.

FIG. 20A shows an example of the width of the image separation filter 3 and the width of the pixel 1 being out of matching with each other, FIG. 20B shows an example of the position of the image separation filter 3 being out of matching, and FIG. 20C shows an example of light from the light source (not shown) to a watcher being out of matching with the pixel 1 and the image separation filter 3.

As is apparent from FIG. 20, a light beam, emitted from the light source and passing through the first image separation mechanism toward the watcher, must pass through the first image region. However, the light beam, the position of the pixel, the position and the width of the separation filter, being out of matching with one another, allow a part of the light beam to pass through the second image region as indicated by x mark. This caused a problem of preventing the image from being separated, that is, generating crosstalk. This is the same about a light beam emitted from the light source and passing through the second image separation mechanism.

SUMMARY OF THE INVENTION

It is an object of the present invention to provide a display device and a method of designing a display device by which generation of crosstalk between images is prevented without providing any image separation mechanism in the pixel.

A display device according to the invention is a display device having a transparent type display element transmitting light projected from a light source to an watching point side, and including pixels forming a first image region and pixels forming a second image forming region, and an image separation filter disposed in being separated from the pixels by a specified region and forming a first image separation mechanism and a second image separation mechanism, and the display device is characterized in that a disposing interval of each of the above-described image separation mechanisms is determined by carrying out a calculation for obtaining the disposing interval on the basis of an angle which a straight line, connecting the above-described watching point and an end point of each image region of the above-described pixels, forms with a perpendicular line from the watching point to the display device, a thickness and a refractive index of the above-described specified region, a length of the above-described perpendicular line, and an interval of the image region of the above-described pixels.

Moreover, it is characterized that the above-described image separation filter in the display device according to the invention is disposed between the above-described watching point and the above-described pixel, a first transparent medium is disposed between the above-described image separation filter and the pixel, and the disposing interval P1 of each of the above-described image separation mechanisms of the above-described image separation filter is determined by carrying out calculation of an operation expression of $$P1=P2-w1\{T/(n^2-t^2)^{1/2}-t/(n^2-t^2)^{1/2}\},$$

with P2, W1, n, t, and T taken as an interval between the image regions of the above-described pixels, a thickness of the above-described first transparent medium, a refractive index of the above-described first transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

Furthermore, it is characterized that the above-described image separation filter in the display device according to the invention is disposed between the above-described light source and the above-described pixel, a second transparent medium is disposed between the above-described image separation filter and the pixel, and the disposing interval P3 of each of the above-described image separation mechanisms of the above-described image separation filter is determined by carrying out calculation of an operation expression of $$P3=P2+w2\{T/(n^2-t^2)^{1/2}-t/(n^2-t^2)^{1/2}\},$$

with P2, W2, n, t, and T taken as an interval between the image regions of the above-described pixels, a thickness of the above-described second transparent medium, a refractive index of the above-described second transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

In addition, it is characterized that the above-described transparent type display element in the display device according to the invention is arranged so as to transmit light projected from the light source onto an illuminated plane disposed on the above-described watching point side, the above-described image separation filter is disposed between the above-described light source and the above-described pixel, a second transparent medium is disposed between the above-described image separation filter and the pixel, and the disposing interval P1 of each of the above-described image separation mechanisms of the above-described image separation filter is determined by carrying out calculation of an operation expression of $$P1=P2-w2\{T/(n^2-t^2)^{1/2}-t/(n^2-t^2)^{1/2}\},$$

with P2, W2, n, t, and T taken as an interval between the image regions of the above-described pixels, a thickness of the above-described second transparent medium, a refractive index of the above-described second transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

Moreover, it is characterized that the above-described transparent type display element in the display device according to the invention is arranged so as to transmit light projected from the light source onto an illuminated plane disposed on the above-described watching point side, the above-described image separation filter is disposed between the above-described illuminated plane and the above-described pixel, a first transparent medium is disposed between the above-described image separation filter and the pixel, and the disposing interval P3 of each of the above-described image separation mechanisms of the above-described image separation filter is determined by carrying out calculation of an operation expression of $$P3=P2+w1\{T/(n^2-t^2)^{1/2}-t/(n^2-t^2)^{1/2}\},$$

with P2, W1, n, t, and T taken as an interval between the image regions of the above-described pixels, a thickness of the above-described first transparent medium, a refractive index of the above-described first transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

In addition, it is characterized that the first and second image separation mechanisms of the above-described image separation filter in the display device according to the invention cause light to be polarized with directions of polarization different from each other.

Moreover, it is characterized that the first and second image separation mechanisms of the above-described image separation filter in the display device according to the invention are wavelength filters different from each other.

Furthermore, it is characterized that the above-described light source in the display device according to the invention is arranged so that a wavelength of a light source for a left eye is different from a wavelength of a light source for a right eye.

A method of designing a display device according to the invention is the method of designing a display device having a transparent type display element transmitting light projected from a light source to an watching point, and comprising pixels forming a first image region and pixels forming a second image forming region, and an image separation filter disposed in being separated from the pixels by a specified region and forming a first image separation mechanism and a second image separation mechanism, which designing method is characterized in that a disposing interval of each of the above-described image separation mechanisms is determined by carrying out a calculation for obtaining the disposing interval on the basis of an angle which a straight line, connecting the above-described watching point and an end point of each image region of the above-described pixels, forms with a perpendicular line from the watching point to the display device, a thickness and a refractive index of the above-described specified region, a length of the above-described perpendicular line, and an interval of the image region of the above-described pixels.

Moreover, it is characterized that the above-described image separation filter in the method of designing the display device according to the invention is disposed between the above-described watching point and the above-described pixel, a first transparent medium is disposed between the above-described image separation filter and the pixel, and the disposing interval P1 of each of the above-described image separation mechanisms of the above-described image separation filter is determined by carrying out calculation of an operation expression of $$P1=P2-w1\{T/(n^2-t^2)^{1/2}-t/(n^2-t^2)^{1/2}\},$$

with P2, W1, n, t, and T taken as an interval between the image regions of the above-described pixels, a thickness of the above-described first transparent medium, a refractive index of the above-described first transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

Furthermore, it is characterized that the above-described image separation filter in the method of designing the display device according to the invention is disposed between the above-described light source and the above-described pixel, a second transparent medium is disposed between the above-described image separation filter and the pixel, and the disposing interval P3 of each of the above-described image separation mechanisms of the above-described image separation filter is determined by carrying out calculation of an operation expression of $$P3=P2+w2\{T/(n^2-t^2)^{1/2}-t/(n^2-t^2)^{1/2}\},$$

with P2, W2, n, t, and T taken as an interval between the image regions of the above-described pixels, a thickness of the above-described second transparent medium, a refractive index of the above-described second transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

In addition, it is characterized that the above-described transparent type display element in the method of designing the display device according to the invention is arranged so as to transmit light projected from the light source onto an illuminated plane disposed on the above-described watching point side, the above-described image separation filter is disposed between the above-described light source and the above-described pixel, a second transparent medium is disposed between the above-described image separation filter and the pixel, and the disposing interval P1 of each of the above-described image separation mechanisms of the above-described image separation filter is determined by carrying out calculation of an operation expression of $$P1=P2-w2\{T/(n^2-t^2)^{1/2}-t/(n^2-t^2)^{1/2}\},$$

with P2, W2, n, t, and T taken as an interval between the image regions of the above-described pixels, a thickness of the above-described second transparent medium, a refractive index of the above-described second transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

Moreover, it is characterized that the above-described transparent type display element in the method of designing the display device according to the invention is arranged so as to transmit light projected from the light source onto an illuminated plane disposed on the above-described watching point side, the above-described image separation filter is disposed between the above-described illuminated plane and the above-described pixel, a first transparent medium is disposed between the above-described image separation filter and the pixel, and the disposing interval P3 of each of the above-described image separation mechanisms of the above-described image separation filter is determined by carrying out calculation of an operation expression of $$P3=P2+w1\{T/(n^2-t^2)^{1/2}-t/(n^2-t^2)^{1/2}\},$$

with P2, W1, n, t, and T taken as an interval between the image regions of the above-described pixels, a thickness of the above-described first transparent medium, a refractive index of the above-described first transparent medium, a sine function of an angle of elevation to a vertical end line of the K-th (K represents an integer) pixel from the above-described watching point, and a sine function of an angle of elevation to a vertical end line of the (K+1)-th (K represents an integer) pixel from the above-described watching point, respectively.

DETAILED DESCRIPTION OF THE PRESENTLY PREFERRED EMBODIMENTS

Figure 1:
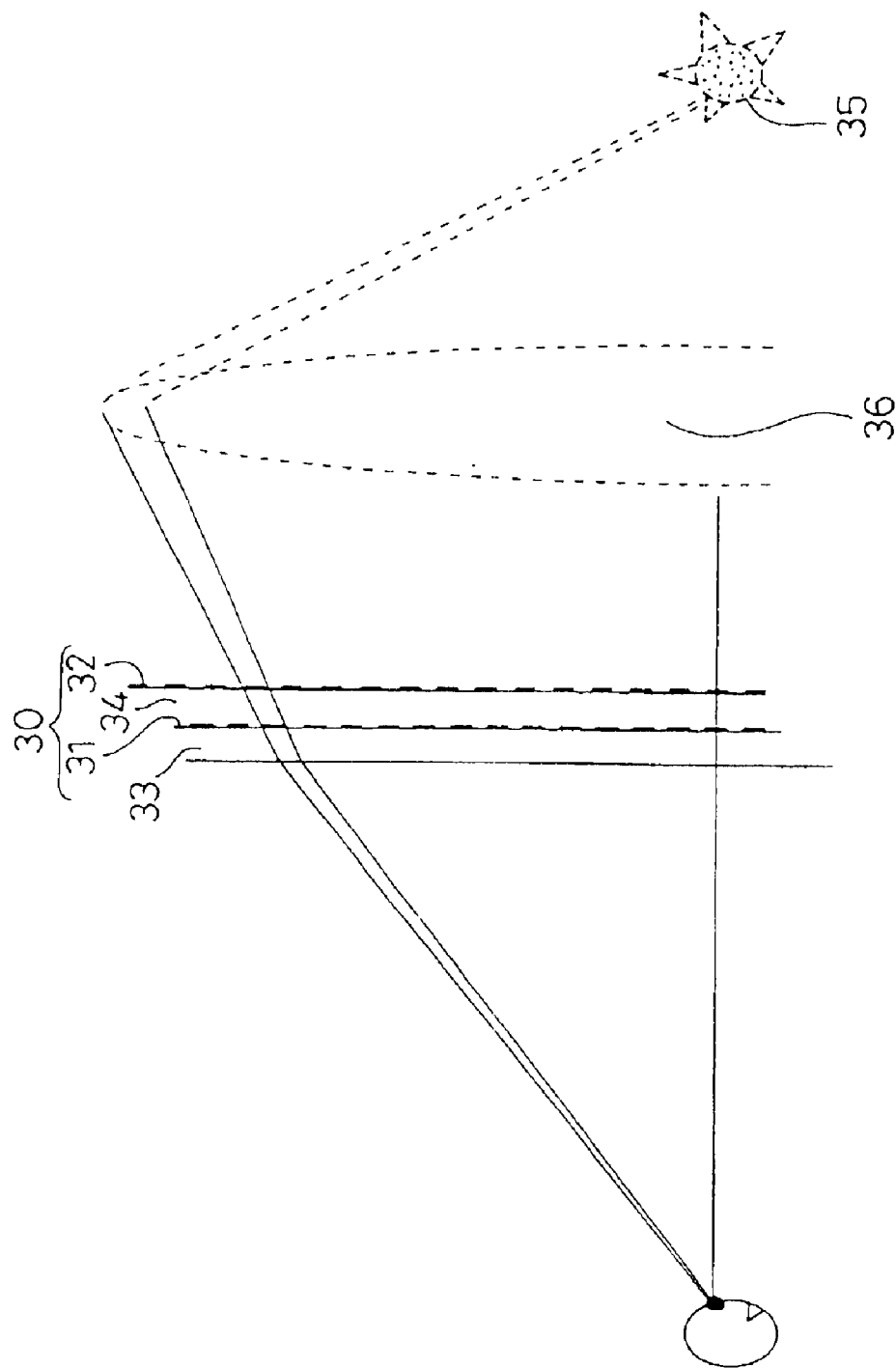
FIG. 1 presents an embodiment according to the invention with an arrangement diagram showing an example of watching a display device with a converging type filter.

In the following, embodiments according to the invention will be explained with reference to the drawings. First, an explanation will be made about image separation mechanisms used in the invention with reference to FIG. 17 to FIG. 19. Thereafter, an explanation will be made in detail about a light converging system, a first example as one of the embodiments according to the invention, with reference to FIG. 1 to FIG. 9. After a basic explanation is finished here, an example about a light diffusing system as a second embodiment according to the invention will be explained with reference to FIG. 10 to FIG. 12. Furthermore, in FIG. 13 to FIG. 16, an example about a parallel light system as a third embodiment according to the invention will be explained.

For a display plane used in the invention, a transparent type display device is used which is represented by a slide film or a liquid crystal display element. Moreover, for the image separation mechanism, there are a method of using linearly polarized light rays crossing at right angles, a method of using circularly polarized light rays, a method of using light rays with wavelengths thereof different from each other (red and blue etc.), and the like.

The above-described image separation mechanism can be arranged by a method of providing on both sides of the above-described pixels. This, however, causes a problem in accuracy in positioning them with each other. Thus the following two methods are often used.

(1) As the above-described image separation mechanism, on a linearly polarizing plate on the side of an entrance face of the above-described backlight, a half-wave plate is provided on every other horizontal line, and on the side of the outgoing light, there is disposed a polarizing plate crossing at right angles to the side of the entrance face.

(2) As the above-described image separation mechanism, on a linearly polarizing plate on the side of an outgoing face of the above-described backlight, a half-wave plate is provided on every other horizontal line, and watching is carried out through two polarizing plates crossing at right angles to each other.

Next to this, an example of arrangement of the above-described image separation mechanism and the separation filter is shown in FIG. 17.

In FIG. 17, reference numeral 10 denotes a liquid crystal display element contained in a case (not shown) of a liquid crystal display device. On the back side of the liquid crystal display element 10, there is disposed a Fresnel lens 11 with a specified distance apart therefrom. The Fresnel lens 11 has a lens face with concentric steps on one side thereof, and makes light, incident from a focal point at the center on the back side of the Fresnal lens, projected as approximately parallel light.

Figure 17A:
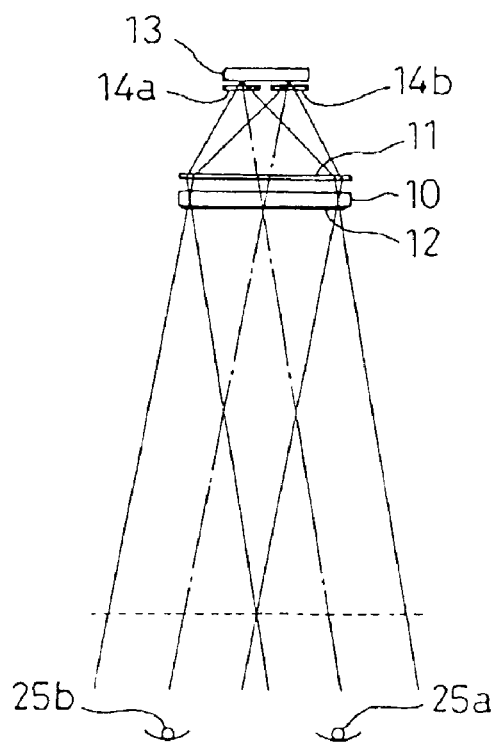
FIG. 17 presents a display device to which the invention is applied, with FIG. 17A being a plan view of an optical system, and FIG. 17B being an exploded perspective view of a liquid crystal display element.

In front of the liquid crystal display element 10, there is mounted a diffusing plate 12 to project light passing through the liquid crystal element 10 onto the watcher side via the diffusing plate 12. Moreover, reference numeral 13 denotes a backlight as a light source for illuminating the liquid crystal display element 10 from the rear face thereof. On the front face side (illumination side) of the backlight 13, a polarizing filter unit for the right eye 14a and a polarizing filter unit for the left eye 14b are arranged at the right and left, respectively, with the center thereof taken as a boundary. A broken line in FIG. 17A shows the distance of distinct vision.

The respective polarizing filter units for the right and left eyes 14a and 14b are arranged as linearly polarizing filters with polarizing directions thereof made to cross at right angles to each other to provide, for example, a plane of polarization sloping upward toward the right and a plane of polarization sloping upward toward the left.

Figure 17B:
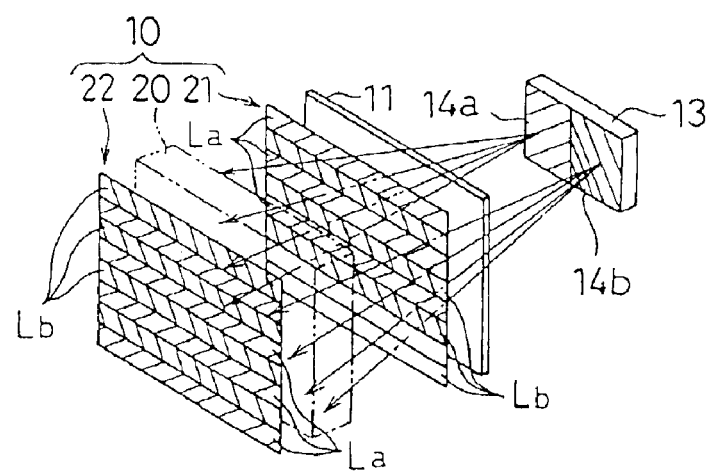

The above-described liquid crystal display device 10 is of a transparent type, which has, as shown in FIG. 17B, a liquid crystal panel 20 and two polarizing filters 20 and 21 each disposed on each face of the liquid crystal panel 20. The liquid crystal panel 20 contains, for example, a liquid crystal rotated through 90° inside a pair of alignment films. This makes incident light rotate through 90° to go out when no voltage is applied across a pair of the alignment films. When a voltage is applied, the incident light is made go out as made incident without being subjected to any rotation.

Each of the two polarizing filters 21 and 22 is arranged to have on each horizontal line of the liquid crystal panel alternately disposed linearly polarizing filter line units La and Lb, crossing at right angles to each other, with direction of polarization of each of facing linearly polarizing filter line units La and Lb on the light source side (rear side) and the watching side (front side), respectively, made to cross at right angles to the other.

Therefore, light from the polarizing filter unit for the right eye 14a or the polarizing filter unit for the left eye 14b is allowed to go in only from the linearly polarizing filter line unit La or Lb having the same plane of polarization as that of the polarizing filter unit. Thus, the light is to go in every other horizontal line and the light made to go in is transmitted when no voltage is applied and shut when a voltage is applied.

Moreover, an arrangement is provided so that image information for the right eye and image information for the left eye are displayed alternately on the liquid crystal panel 20 of the above-described liquid crystal display element 10 on each horizontal line in being aligned with light transmission line of the two polarizing filters 21 and 22.

Therefore, when a watcher watches the liquid crystal display element 10 at the distance of distinct vision (near point distance), only light of an image for the right eye is incident on the right eye 25a and only light of an image for the left eye is incident on the left eye 25b independently of each other, which can provide viewing as a stereoscopic image due to three-dimensional visual perception based on binocular disparity.

Figure 18:
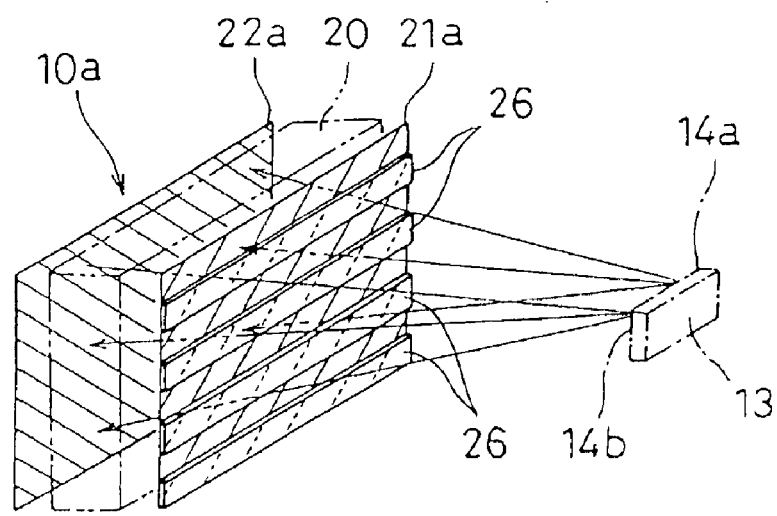
FIG. 18 presents a display device, to which the invention is applied, with an exploded perspective view of a liquid crystal display element.

As another example of the above-described liquid crystal element, there is a liquid crystal element 10a shown in FIG. 18. In FIG. 18, the liquid crystal element 10a has a liquid crystal panel 20, and two polarizing filters 21a and 22a each being disposed on each face of the liquid crystal panel 20. The arrangement of the liquid crystal panel 20 is the same as that shown in FIG. 17 except differences in arrangements of two polarizing filters 21a and 22b.

Namely, each of the polarizing filters 21a and 22a is a linearly polarizing filter with the plane of polarization being the same over the whole face. However, the planes of polarization of the two polarizing filters are provided in directions crossing at right angles to each other. Furthermore, to the polarizing filter 21a on the light source side, there are attached half-wave plates 26 on every other horizontal lines of the liquid crystal panel 20.

Figure 19A:
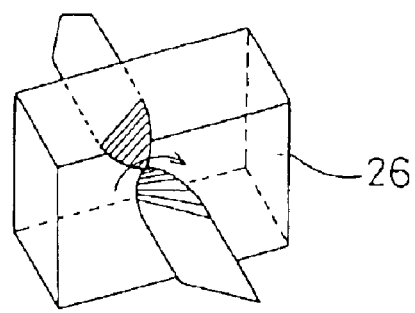
FIG. 19 presents a display device to which the invention is applied, with FIG. 19A being an explanatory diagram showing light in a polarized state in a half-wave plate, and FIG. 19B being an explanatory diagram showing light in being incident onto a polarizing filter on the light source side.
Figure 19B:
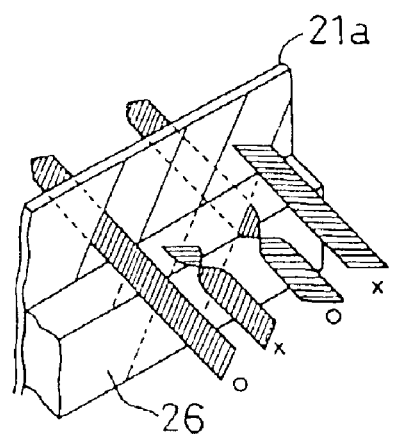
Figure 20A:
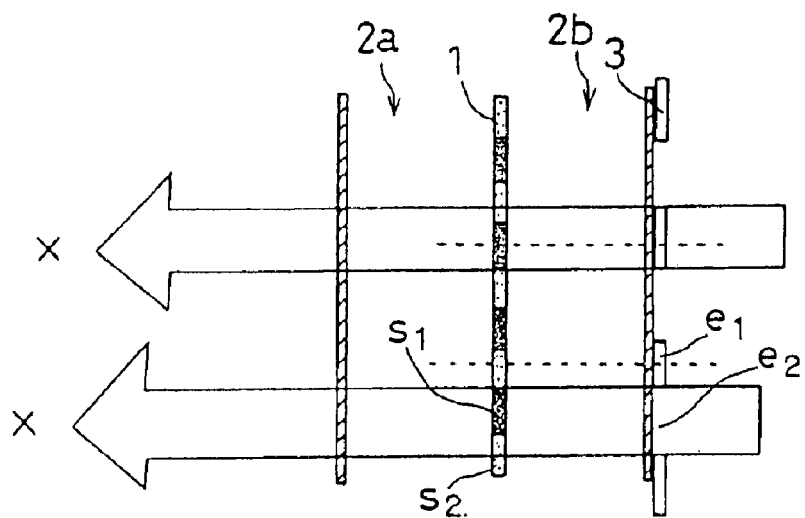
FIG. 20 is an explanatory diagram of a principal part presenting problems in a conventional display device.
Figure 20B:
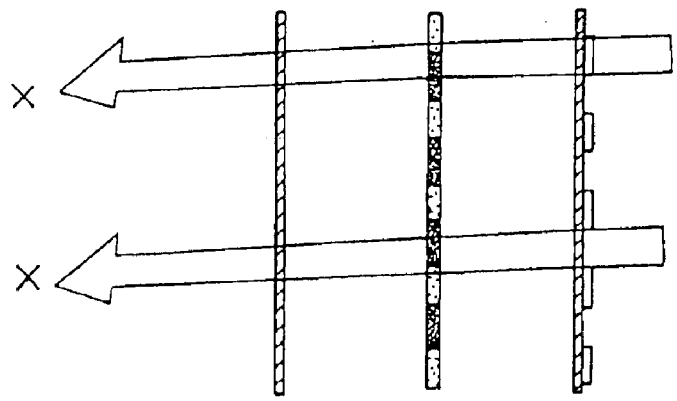
Figure 20C:
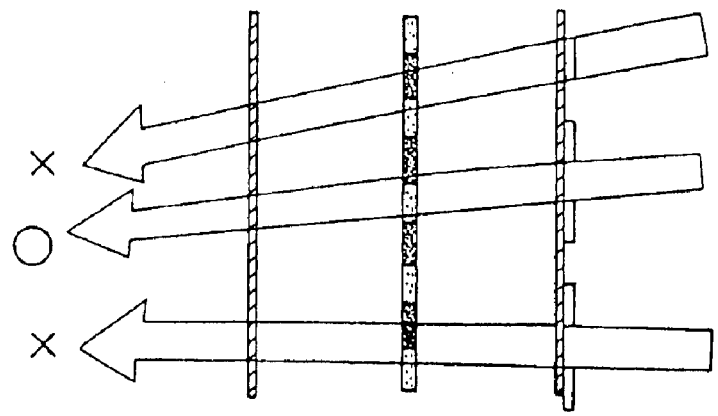

The half-wave plate 26 is disposed so that light incident thereon is turned through 90° before going out therefrom as shown in FIG. 19A. In FIG. 19B, polarized light sloping upward toward the left can not pass through a line of the polarizing filter 21a without the half-wave plate 26. While, with the half-wave plate 26, the polarized light is turned through 90° to be polarized light sloping upward toward the right, which can pass through the line of the polarizing filter 21a. Conversely, polarized light sloping upward toward the right can pass through a line of the polarizing filter 21a without the half-wave plate 26. While, with the half-wave plate 26, the polarized light is turned through 90° to be polarized light sloping upward toward the left, which can not pass through the line of the polarizing filter 21a.

In addition, the direction of polarization of all of the light immediately after being incident on the polarizing filter 21a on the light source side becomes upward toward the right. Therefore, all of directions of polarization of the polarizing filter 22a on the watching side can be a direction upward toward the left to result in cost reduction.

Moreover, instead of the above-described linearly polarized light, circularly polarized light can be used. Further, instead of the above-described Fresnel lens 11, a concave mirror can be used.

FIG. 1 to FIG. 9 relate to an example of a system of converging light as one of a first embodiment according to the invention. In the figures, a pixel member 31 of a liquid crystal element 30 has an arrangement in which a first image region (a pixel region displaying a first image) and a second image region (a pixel region displaying a second image) are alternately formed in the vertical direction, and an image separation filter 32 has an arrangement in which a first image separation mechanism and a second image separation mechanism are alternately formed in the vertical direction. The above-described pixel member 31 and the image separation filter 32 are mounted via transparent glasses 33 and 34 (specified regions) each having a specified thickness.

FIG. 1 is a view in which there are drawn from the side optical paths on each of which a light beam emitted from a light source 35 passes through a specified image region on a display plane toward a watcher. This is an optical system in which the light beam emitted from the light source 35 disposed in proximity to a converging point of first optical means is incident on the first optical means 36 (for example, a convex lens etc.) to illuminate the display plane and passes through the image separation filter 32 on the display plane before being converged toward a position of a head of the watcher.

Figure 2:
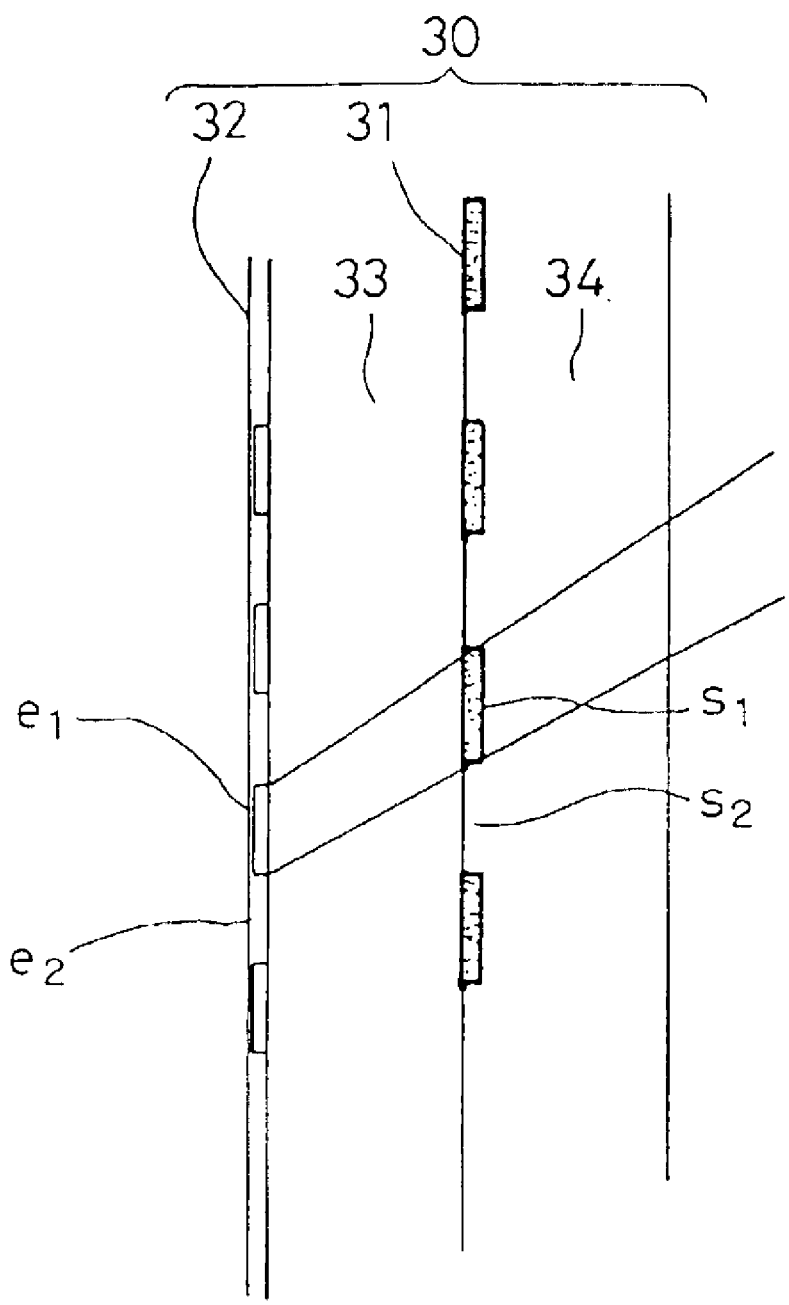
FIG. 2 presents an embodiment according to the invention with an explanatory diagram of a principal part showing an example of providing a front filter.
Figure 3:
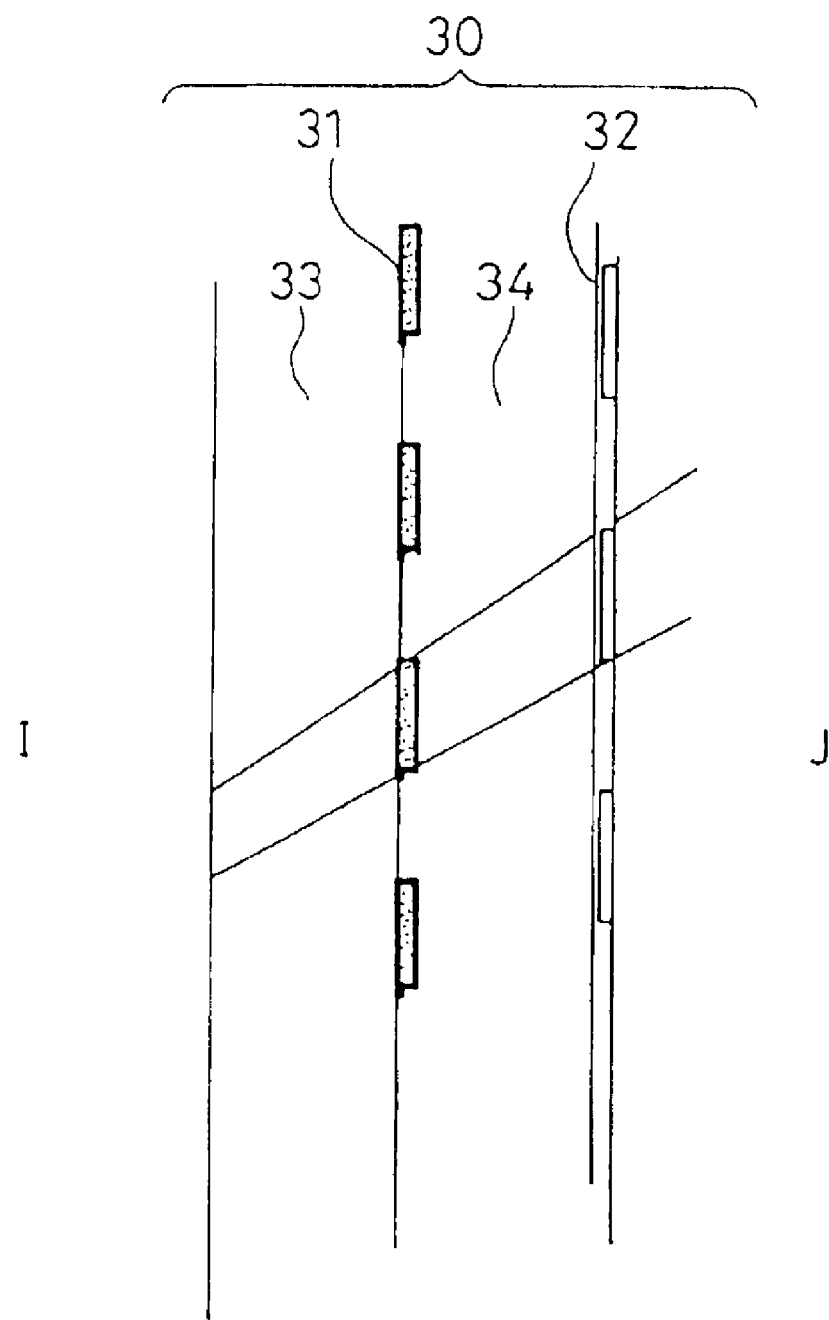
FIG. 3 presents an embodiment according to the invention with an explanatory diagram of a principal part showing an example of providing a rear filter.

In the invention, as shown in FIG. 2 and FIG. 3, in a region on a light beam passed through the first image region $s_1$, the first image separation mechanism $e_1$ is disposed without the second image separation mechanism $e_2$ being disposed. Furthermore, in a region on a light beam passed through the second image region $s_2$, the second image separation mechanism $e_2$ is disposed without the first image separation mechanism $e_1$ being disposed. In order to provide such a disposition, an optical path of a light beam corresponding to an image region of each pixel is traced so as to provide each of the image separation mechanism $e_1$ and $e_2$ for each region connecting cross points of the optical paths and a filter attaching plane.

A state of the pixel and the image separation filter at this time is shown in an enlarged view in FIG. 2 or in FIG. 3 with FIG. 2 showing an example of disposing the image separation filter on the side of a display plane watcher and FIG. 3 showing that on the back side.

This makes the light beam passing through the first image region $s_1$ of the pixel member 31 surely pass through the first image separation mechanism $e_1$ of the image separation filter 32, and the light beam passing through the second image region 52 of the pixel member 31 surely pass through the second image separation mechanism $e_2$ of the image separation filter 32, by which separation is surely carried out without causing the light beam to enter the other image separation mechanism to generate no crosstalk between images.

Next, with reference to FIG. 4 to FIG. 8, with the converging rear filter disposing type shown in FIG. 3 taken as an example, a condition of arranging the image separation filter will be examined specifically in detail with the explanation thereof.

A condition is provided in which an interval between each of the image regions of the pixel member 31 on the display plane is taken as an uniform interval of P2 and an watcher is at a light converging point of the optical means 36, with a distance from the display plane taken as D. Let the above-described glasses 33 and 34 have thicknesses W1 and W2 from the watcher side, respectively, with refractive index of each of them equally taken as n. A width of the image separation filter 32 (a disposing interval between the image separation mechanisms) at this time will be obtained which is required in watching a K-th pixel from the center of the display plane.

Moreover, in the pixel member 31 in the embodiment, the disposing interval P2 between the second image regions is the width of the first image region, and a disposing interval between the first image regions is the width of the second image region.

Furthermore, in the image separation filter 32 in the embodiment, the disposing interval P1 or P3 between the second image separation mechanisms is the width of the first image separation mechanism, and a disposing interval between the first image separation mechanisms is the width of the second image separation mechanism.

Let angles of elevation to vertical end lines of the K-th and (K+1)-th pixels from the watching point be $\theta_{k+1}$ and $\theta_k$, respectively, and let angles of light beams in correspondence therewith that pass through the glasses 33 and 34 be $\alpha_{k+1}$ and $\alpha_k$ as shown in the figure.

Furthermore, on the basis of the above-described angles of elevation $\theta_{k+1}$ and $\theta_k$, angles $\alpha_{k+1}$ and $\alpha_k$, thicknesses W1 and W2 and refractive index n of the glasses 33 and 34, distance D from the watching point to the display device, and interval (P2) between the image regions of the pixel 31, calculations are carried out which are for obtaining the disposing intervals (P1 or P3) between each of the image separation mechanisms of the image separation filter 32. This allows to obtain P1 (the disposing interval between the second image separation mechanisms, that is, the vertical width of the first image separation mechanism) when providing the filter in front of the display plane watcher as shown in the figure, and P3 (the disposing interval between the second image separation mechanisms, that is, the vertical width of the first image separation mechanism) when providing the filter on the back side.

The above calculations are as follows.

Figure 4:
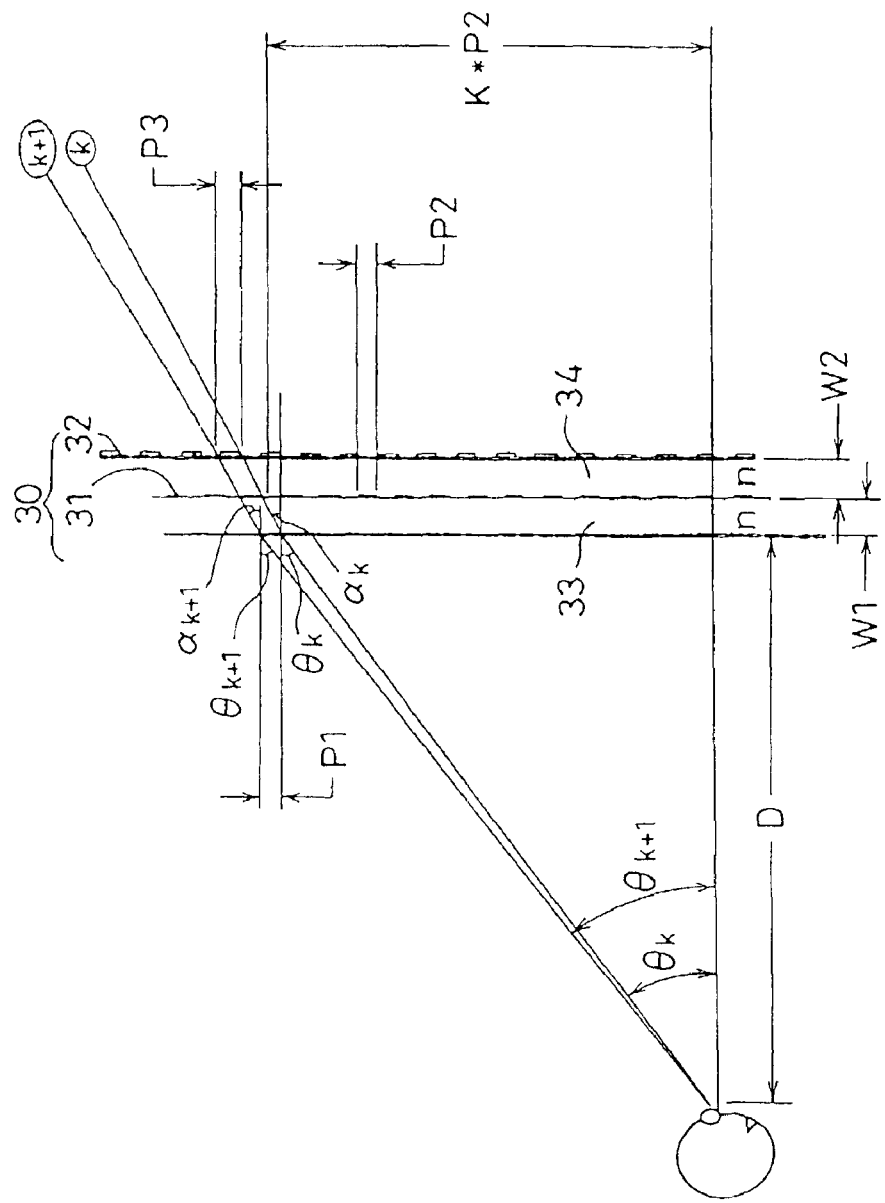
FIG. 4 presents an embodiment according to the invention with an arrangement diagram showing a relationship between a width of a pixel and a width of an image separation filter both on the k-th line from the front of a watcher.

In FIG. 4, the angles of elevations are under conditions of $0° \leq \theta_k < 90°$, and $0° \leq \theta_{k+1} < 90°$. From $n \sin \alpha_k = \sin \theta_k$ (Snell's law), there is obtained as, $$\tan \alpha_k = (\sin \alpha_k / \cos \alpha_k) = (\sin \theta_k / n) / \{1 - (\sin \theta_k / n)^2\}^{1/2} \quad (1)$$
$$= (\sin \theta_k / n)\{n^2 / (n^2 - \sin^2 \theta_k)\}^{1/2}$$
$$= \sin \theta_k / (n^2 - \sin^2 \theta_k)^{1/2}.$$

Furthermore, from FIG. 4, there is given as, $$kP2 = D \tan \theta_{k+1} \tan \alpha_k \quad (2).$$

Then, substitute the expression (1) into the expression (2), we have $$kP2=D\sin\theta_k/(1-\sin^2\theta_k)^{1/2}+w1\sin\theta_k/(n^2-\sin^2\theta_k)^{1/2} \qquad (3).$$

Here, if we let $\sin\theta_k \equiv t$, we have $$f(t)=kP2(1-t^2)^{1/2}(n^2-t^2)^{1/2}-Dt(n^2-t^2)^{1/2}-w1t(1-t^2)^{1/2} \qquad (4).$$

Since $0° \leq \theta_k < 90°$, we have $0 \leq t < 1$. Then, letting k be a constant, there is obtained t that makes $f(t)=0$, which is renewed as a constant t.

Letting $t=\sin\theta_k$, and similarly $T=\sin\theta_{k+1}$ for k+1, P3 and P1 are obtained as, $$P3=P2+w2\{T/(n^2-t^2)^{1/2}-t/(n^2-t^2)^{1/2}\} \qquad (5)$$

$$P1=P2-w1\{T/(n^2-t^2)^{1/2}-t/(n^2-t^2)^{1/2}\} \qquad (6),$$

where, $$\{T/(n^2-t^2)^{1/2}-t/(n^2-t^2)^{1/2}\}=(\tan\alpha_{k+1}-\tan\alpha_k) \qquad (7).$$

Figure 6B:
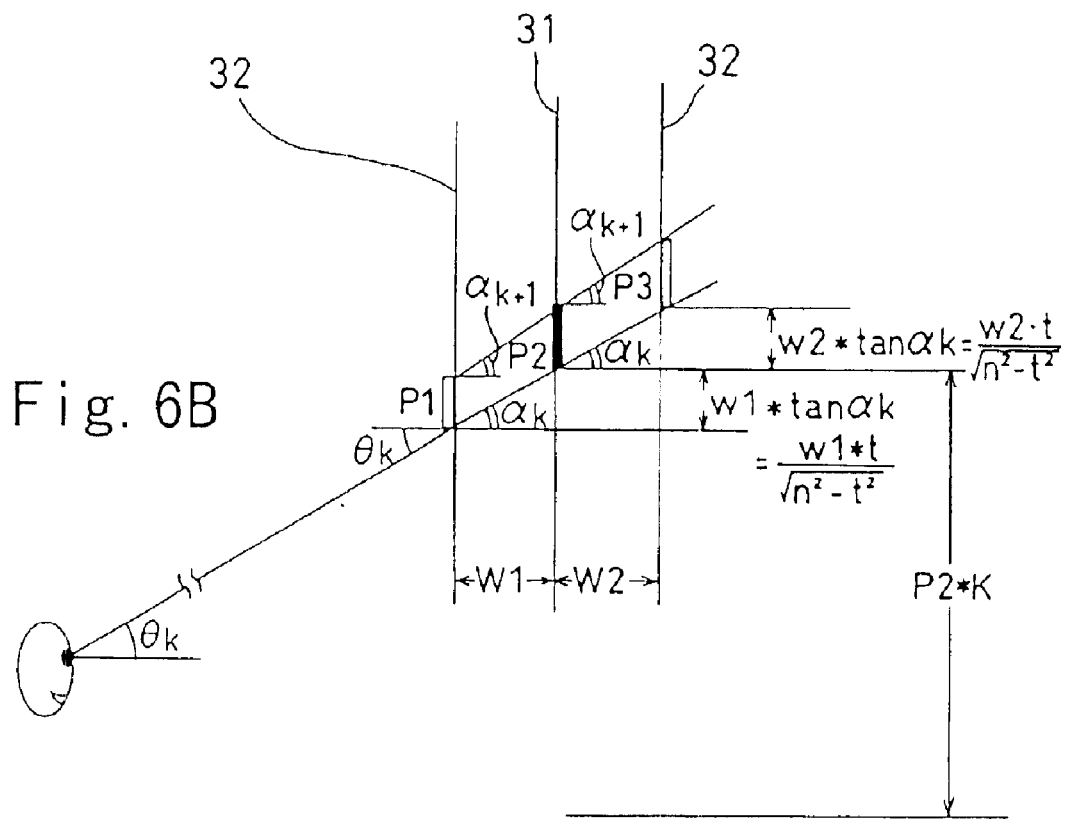
FIG. 6 presents an embodiment according to the invention with explanatory diagrams of a principal part each showing positional arrangement of the pixel, the filter, and a light beam.
Figure 6A:
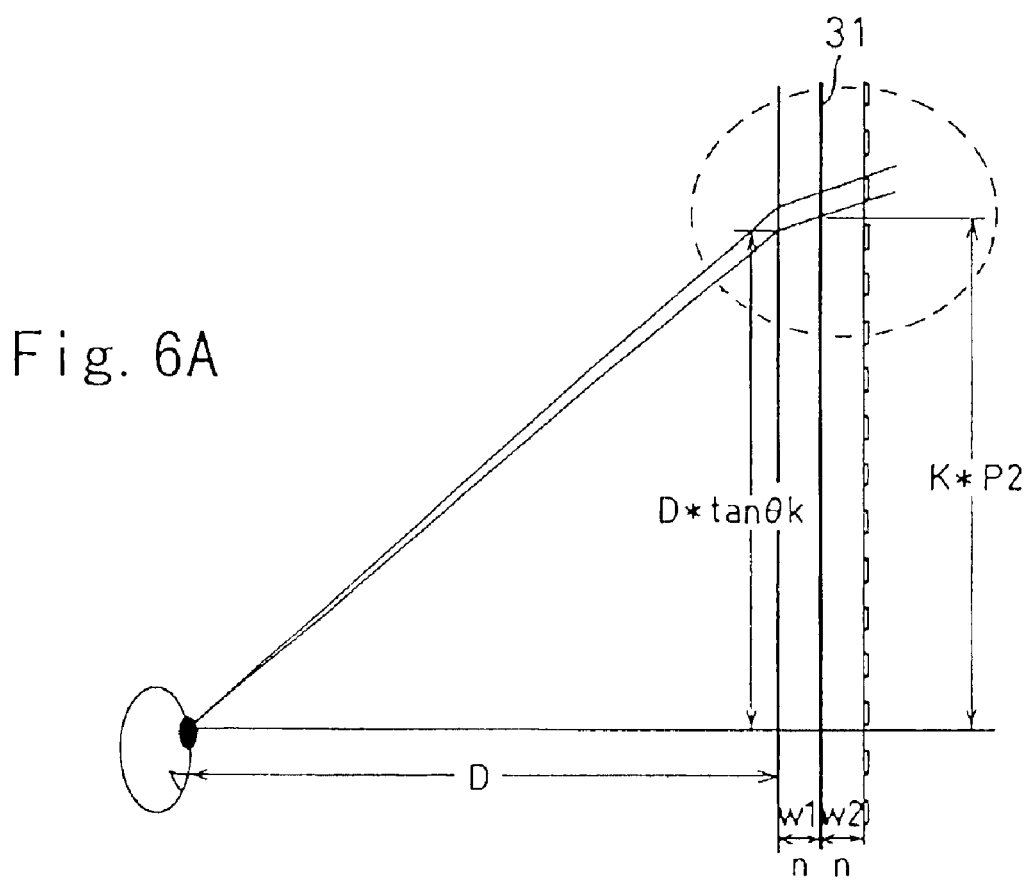

The above expression (2) expresses a height (distance) from the center of the display plane to the K-th pixel 31. Dispositional relation between the pixel 31 (for example, the first image region) and the image separation filter 32 (for example, the first image separation mechanism) is as shown in FIG. 6 with relational expressions about the providing distance between them given as follows:

$$W1*\tan\alpha_k=W1*t/(n^2-t^2)^{1/2} \qquad (8)$$

$$W2*\tan\alpha_k=W2*t/(n^2-t^2)^{1/2} \qquad (9)$$

where t is the t used in the above-described expression (5) and expression (6), for which $\sin\theta_k$ for $f(t)=0$ in the above-described expression (4) is taken as t. Moreover, FIG. 6B shows inside of the round mark with a broken line in FIG. 6A.

Figure 5:
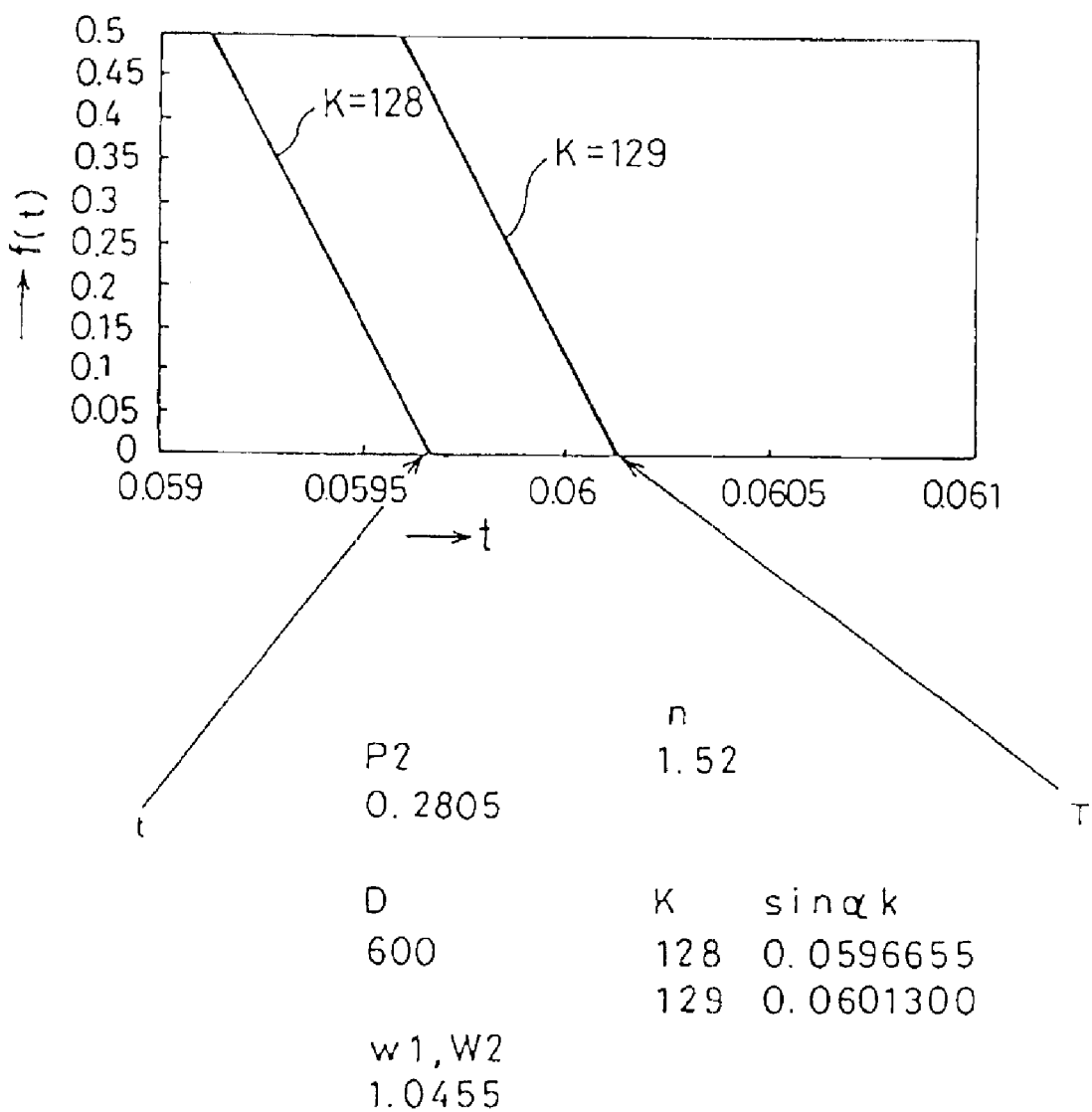
FIG. 5 presents an embodiment according to the invention with a graph explaining how to obtain constants t and T.

In the following, FIG. 4 is examined with specific values with reference to FIG. 5 to FIG. 9. FIG. 5 shows how to obtain the constants t and T in the above-described operation expressions, by which values of f(t) and t in FIG. 4 are obtained under the condition shown in the figure. From the graph in FIG. 5, for K=128, there are obtained approximately as t=0.0596655 and T=0.0601300. By the above-explained operation expressions, P1 of the filter on the front side is obtained as P1=0.280179758, a little smaller than 0.2805 of the pixel width (P2). Further, P3 on the back side is obtained as P3=0.280820242, a little larger than the pixel width (P2).

Figure 7:
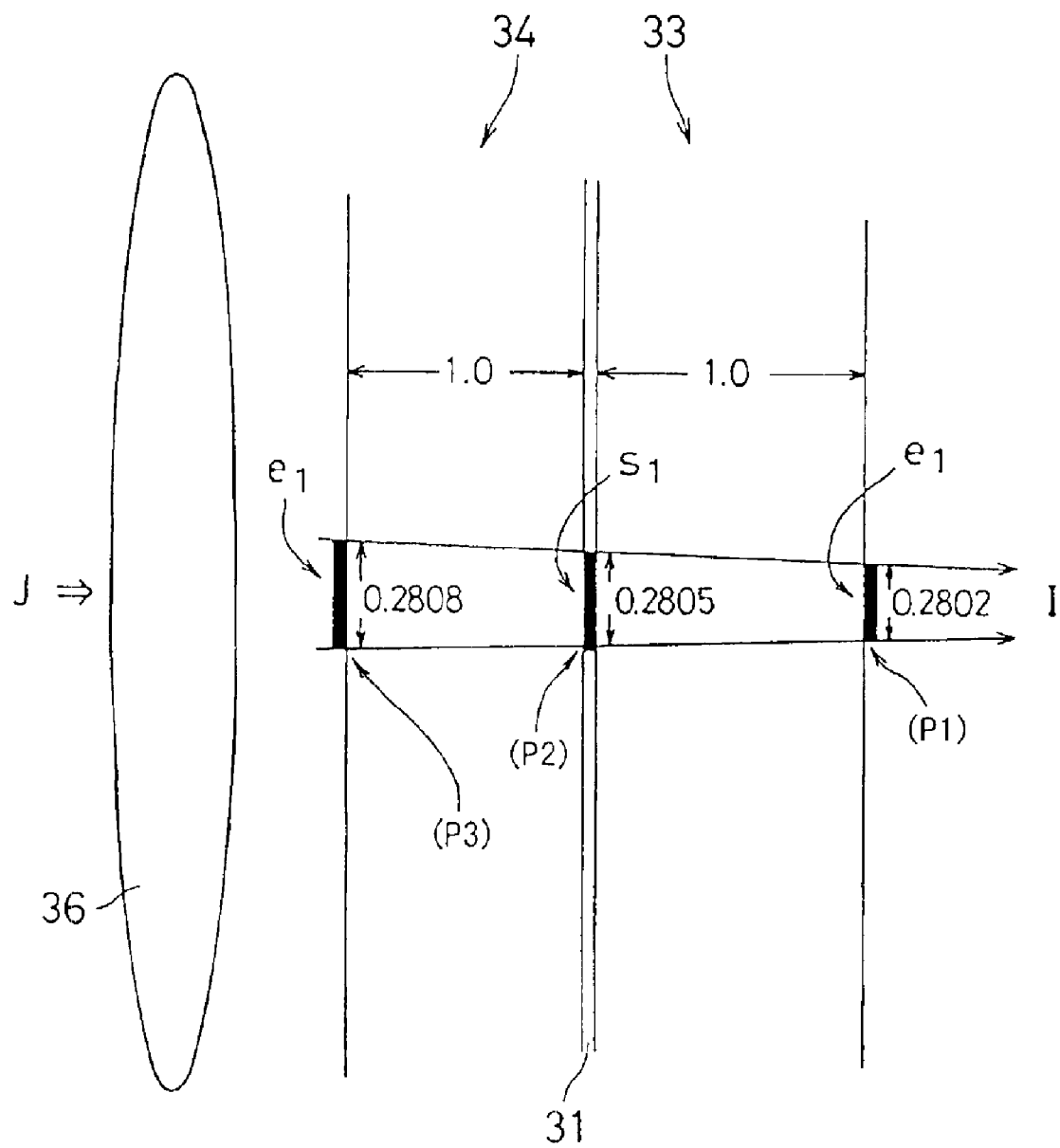
FIG. 7 presents an embodiment according to the invention with an explanatory diagram of a principal part showing a relationship between the pixel and the filter.

With a display device arranged with thus obtained widths P2, P1, and P3, relationship between the pixel and filters at k=128 is shown in FIG. 7. As is apparent from the FIG. 7, a light beam from a light source J passing through the first pixel separation mechanism $e_1$ (P3 and P1) toward a watcher I can pass through the first image region $s_1$ (P2) only. Thus, by making differences between P2 and P1, and P2 and P3 as being about ±0.3 microns, generation of crosstalk of the image could be surely prevented.

Figure 8A:
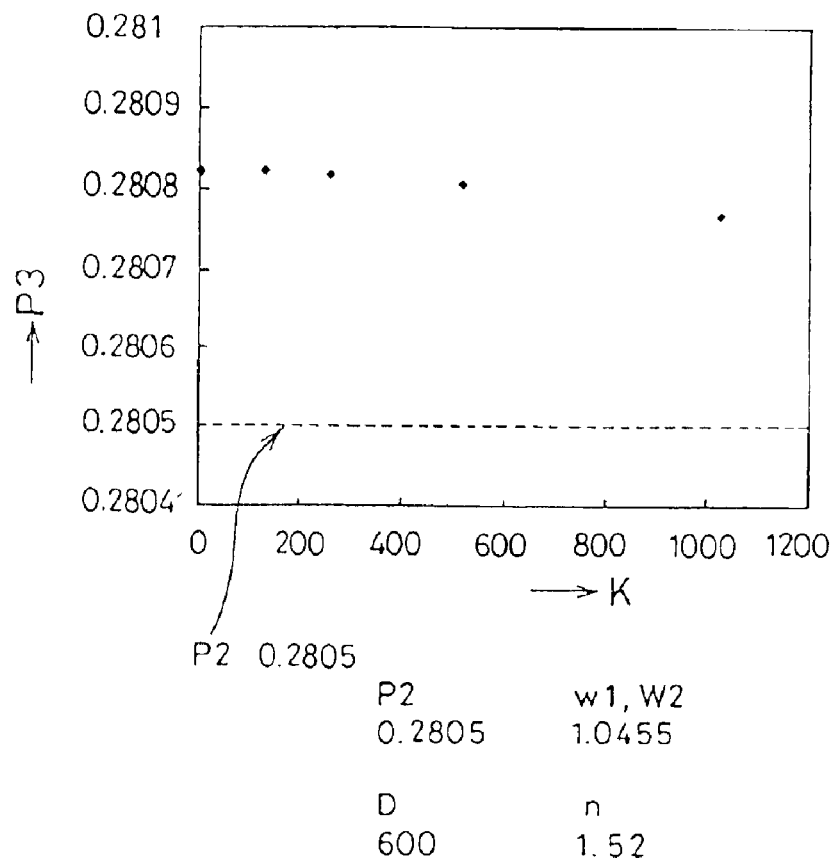
FIG. 8 presents an embodiment according to the invention with graphs each showing change in a width of the k-th pixel from the center of a display plane.
Figure 8B:
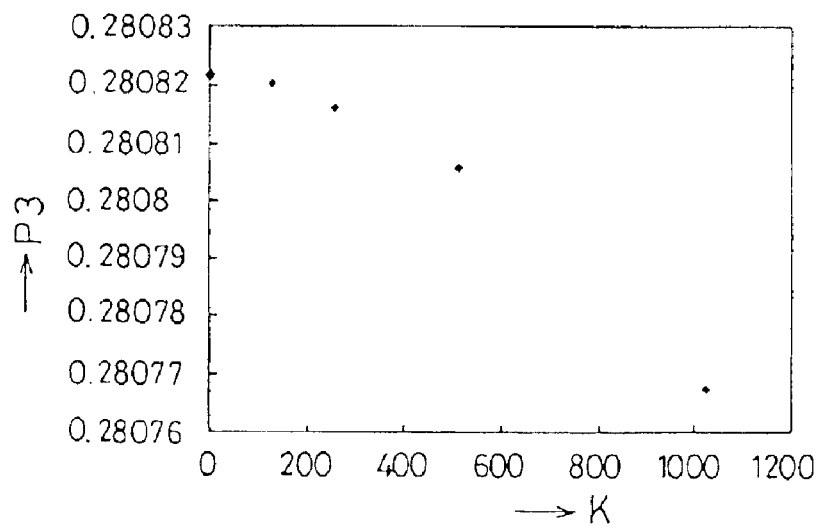

FIG. 8 shows values of P3, obtained by the methods shown in FIG. 4 and FIG. 5, plotted about K. As is apparent from FIG. 8A, the value of P3 is about 0.2808 and approximately constant. It is understood that, as is apparent from the graph of FIG. 8B, an enlarged view of FIG. 8A, the width of P3 tends to narrow with an increase in the distance from the center of the display plane (that is, k).

However, the pixel at k=1000 is in this case a distance from the center of 0.2805*1000=280.5 (mm), which provides, with D=600 (mm) taken into consideration, an angle of elevation of θ=25.0560, a very large angle of looking up. Supposing that the display has an aspect ratio of 4:3, the above becomes also apparent from the fact that this corresponds to watching a 36.8 inch display at a short distance of 60 cm therefrom. With respect to an angle of view and k larger than the above, the device is not actual. Therefore, for a fixed pixel width P2, a width P1 or P3 of the image separation filter can be actually substituted by an always fixed one.

Figure 9A:
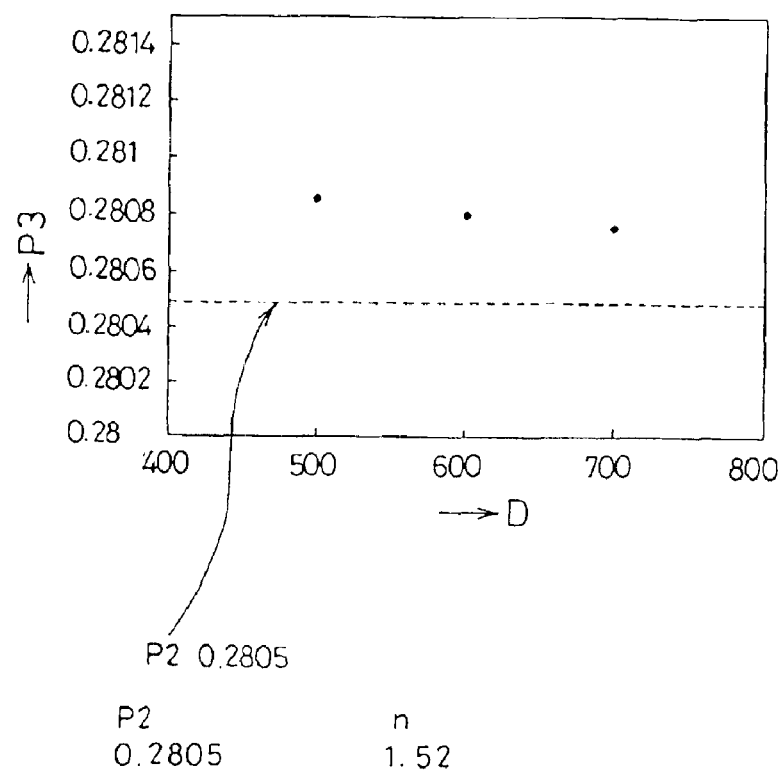
FIG. 9 presents an embodiment according to the invention with graphs each showing a relationship between a position of a head of a watcher and a width of the filter.
Figure 9B:
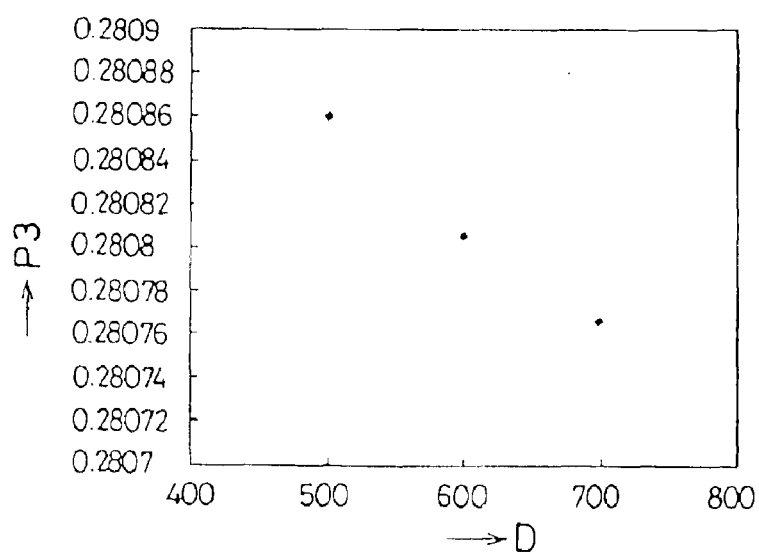

FIG. 9 shows values of P3 to the distance D in the depth direction. It is understood that the change in P3 is not so large for D=500 to 700 (mm), and that the width (P3) of the rear filter tends to become narrow with an increase in the distance in the depth direction.

The above examination on the optical paths passing the pixels on the display plane, carried out with a converging type taken as an example with reference to FIG. 1 to FIG. 9, showed that an image separation filter can be brought into realization without any crosstalk by the other image.

Figure 10:
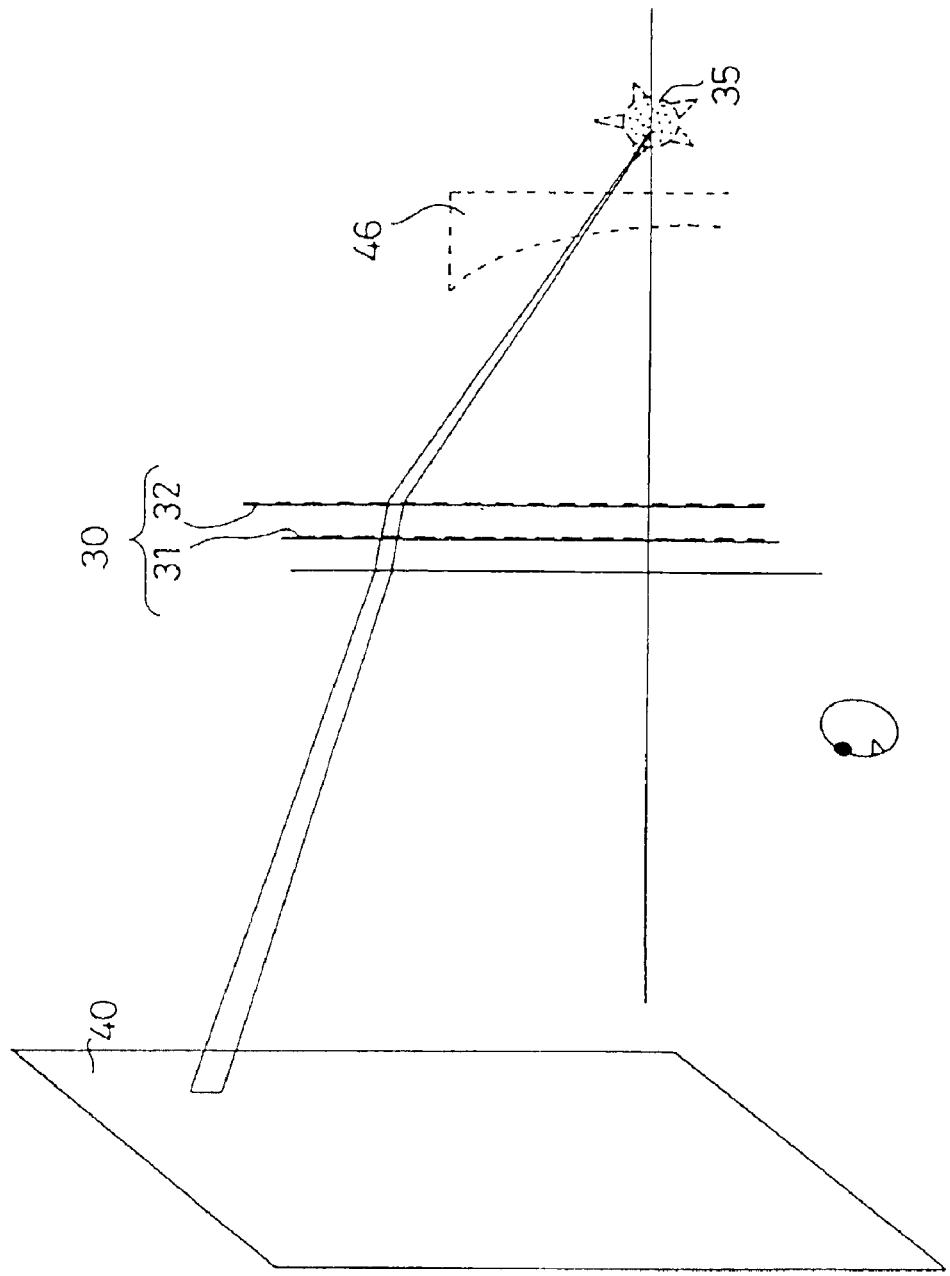
FIG. 10 presents another embodiment according to the invention with an arrangement diagram showing an example of watching a display device with a diffusing type filter.

Next, with reference to FIG. 10 to FIG. 12, characteristics of the image separation filter according to the invention will be explained about the case with a diffusing type optical system. FIG. 10 shows a schematic arrangement with a case used in a projection system taken as an example. It is an example in which light emitted from a light source 35 is diverged through a second optical means 46 and illuminates the whole display plane before being diffused to be projected on a screen 40 as an image being served to enjoyment. Also in the example, like in the previous example, each of FIG. 11 and FIG. 12 shows a state of a light beam passing a pixel.

Figure 11:
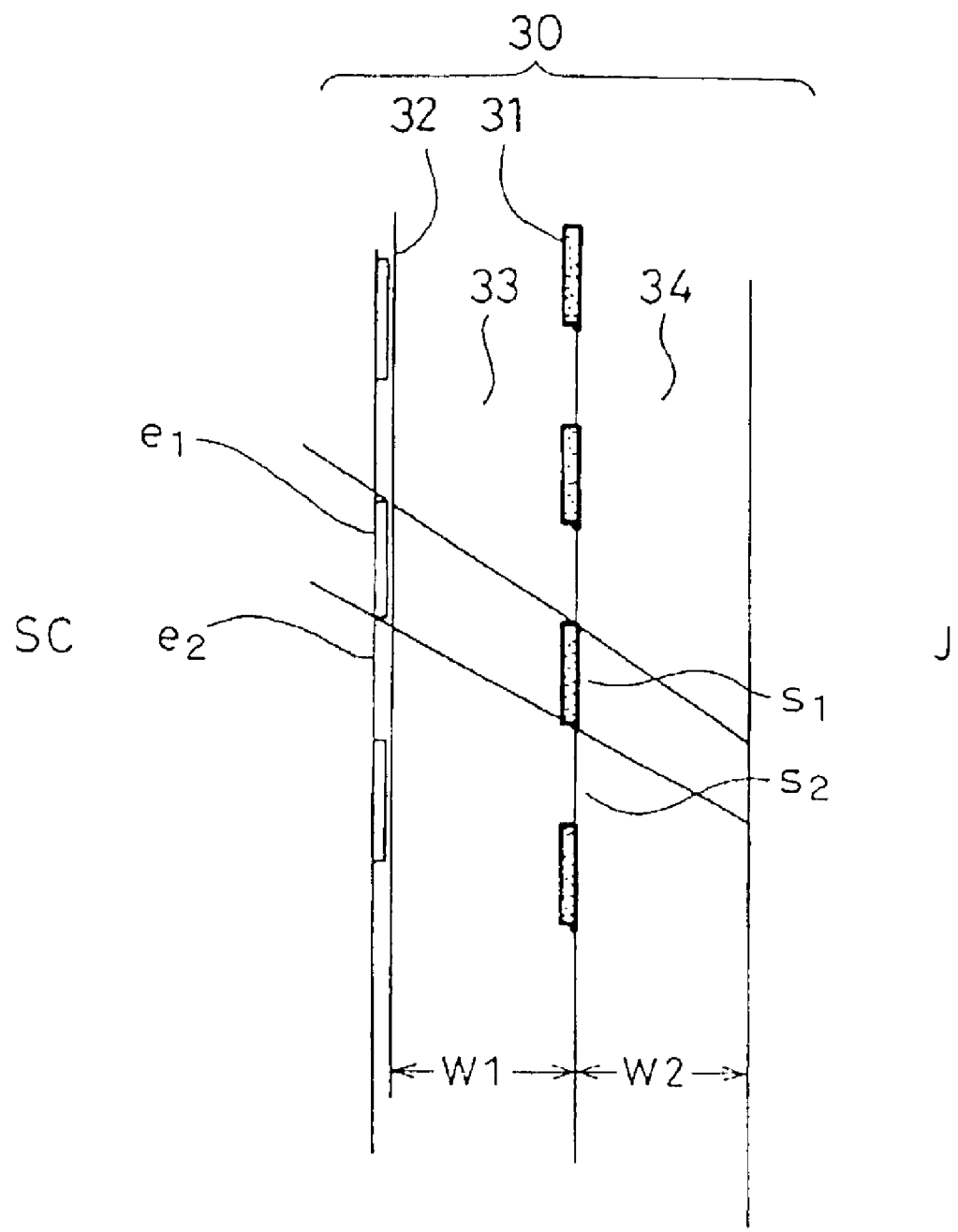
FIG. 11 presents another embodiment according to the invention with an explanatory diagram of a principal part showing an example of providing a front filter.
Figure 12:
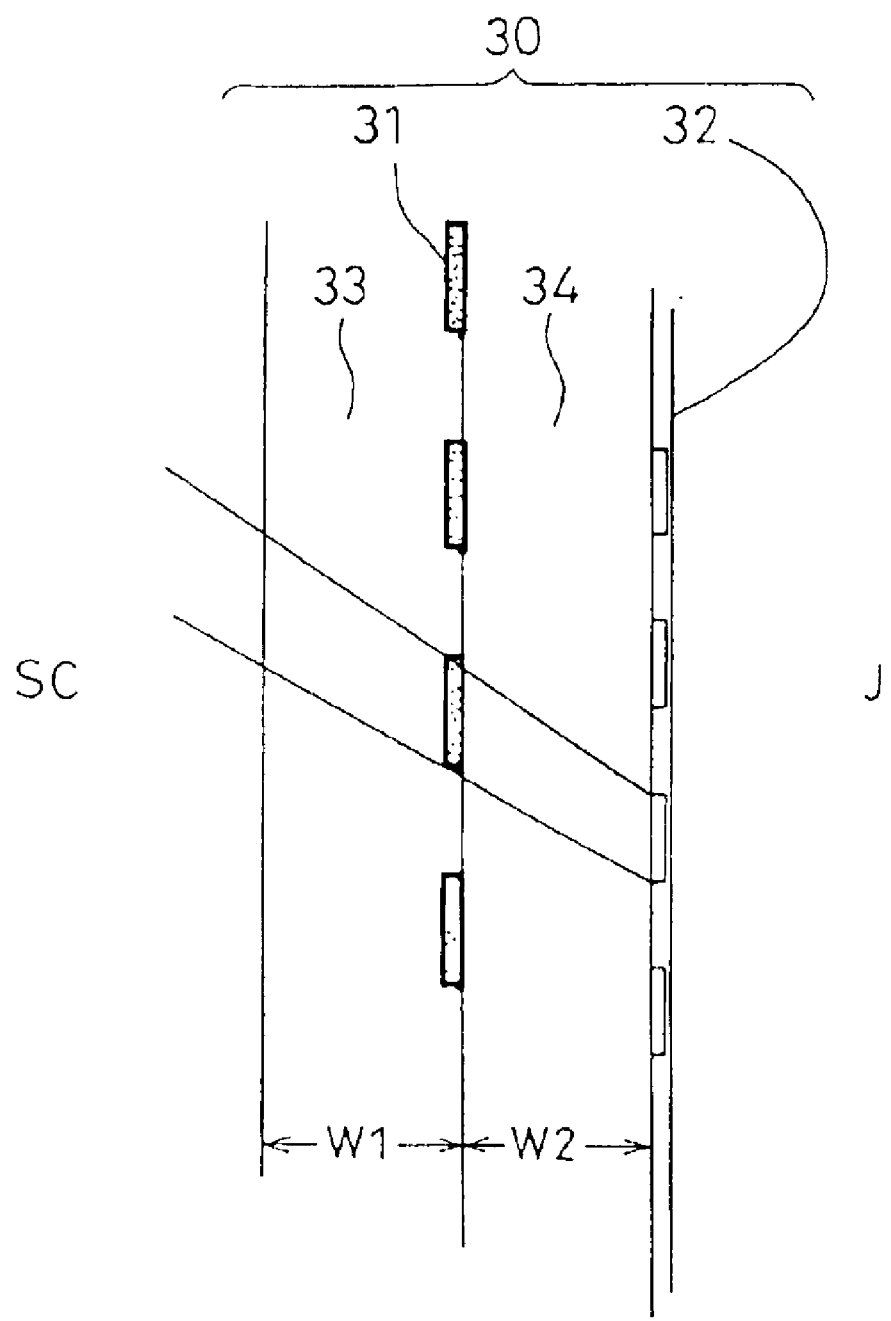
FIG. 12 presents another embodiment according to the invention with an explanatory diagram of a principal part showing an example of providing a rear filter.

As is apparent from the figures, it is understood that an arrangement must be provided so that, in FIG. 11 in which the image separation filter 32 is provided on the side opposite to a light source J about a display plane (on the side of a screen SC), a width of the filter becomes wider than a width of the pixel, and conversely, in FIG. 12 in which the image separation filter 32 is provided on the inner side of the display plane (on the side of the light source J), the width of the filter becomes narrower than the width of the pixel. The widths of the filters and the widths of the pixels are obtained by the same method as that in the example of the converging type explained with reference to FIG. 1 to FIG. 9.

However, although the operation expressions for obtaining disposing intervals (P1 and P3) of the image separation mechanisms of the image separation filter 32 in the case with the diffusion type optical system are theoretically the same as those in the above, there is a little difference in each of the parameters. Namely, let angles of elevation to vertical end lines of the K-th and (K+1)-th pixels from the light source 35 be θk+1 and θk, respectively, and let angles of light beams in correspondence therewith that pass through the glasses 33 and 34 be αk+1 and αk.

Furthermore, on the basis of the above-described angles of elevation θk+1 and θk, angles αk+1 and αk, thicknesses W1 and W2 and refractive index n of the glasses 33 and 34, distance D from the watching point to the display device, and interval (P2) between the image regions of the pixel 31, calculations are carried out which are for obtaining the disposing intervals (P1 or P3) between each of the image separation mechanisms.

When the image separation filter 32 is provided on the screen side opposite to the light source as FIG. 11, the width of the filter is arranged to be wider than the pixel width. Therefore, in conformity to the above-described expression (5), calculation of an operation expression of $$P3=P2+w1\{T/(n^2-t^2)^{1/2}-t/(n^2-t^2)^{1/2}\} \qquad (10)$$

is carried out to obtain the filter width (P3).

Moreover, when the image separation filter 32 is provided on the light source side as FIG. 12, the width of the filter is arranged to be narrower than the pixel width. Therefore, in conformity to the above-described expression (6), calculation of an operation expression of $$P1=P2-w2\{T/(n^2-t^2)^{1/2}-t/(n^2-t^2)^{1/2}\} \qquad (11)$$

is carried out to obtain the filter width (P1).

Here, a projection system is taken as the example. The system, however, can be any one in which the light beam passing through the display plane is in the direction of diffusion therein, so that the invention can be applied also to an optical system such that a small display plane is looked in.

Figure 13:
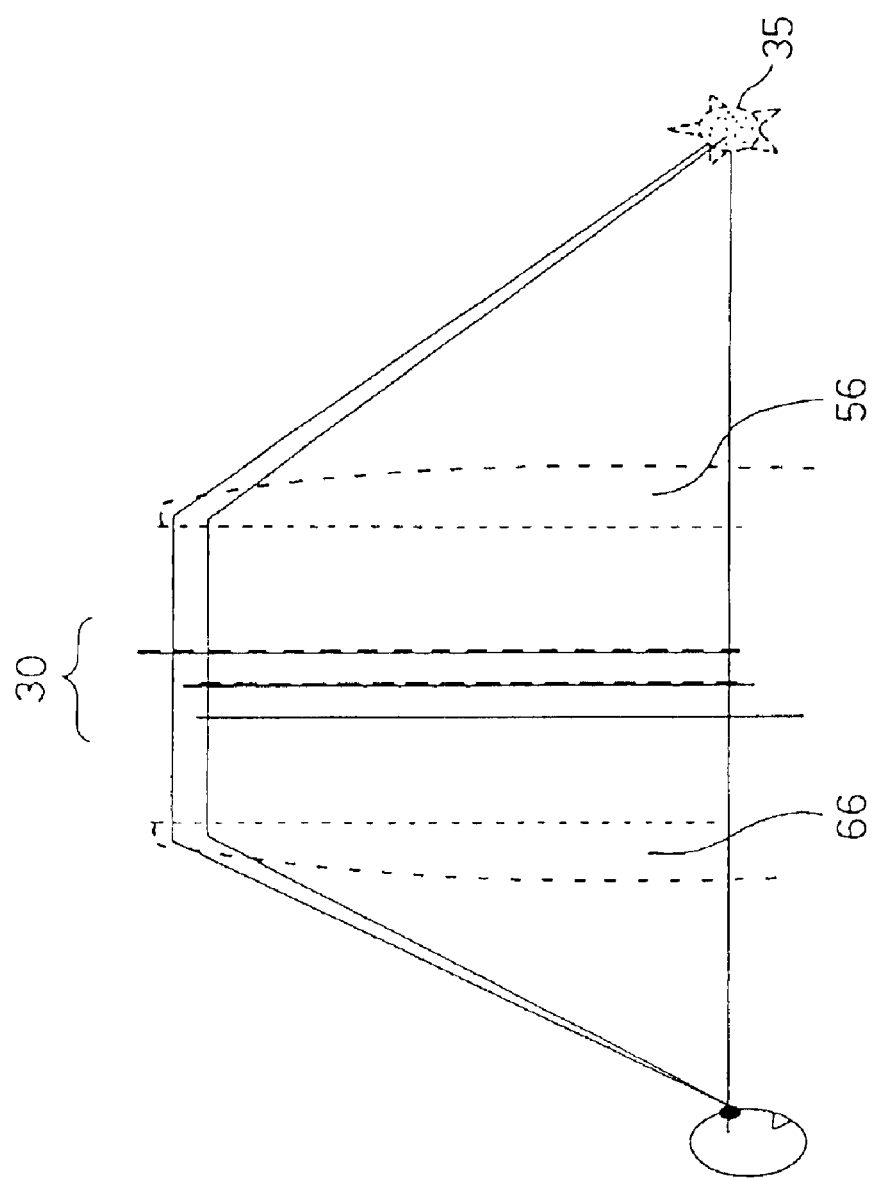
FIG. 13 presents another embodiment according to the invention with an arrangement diagram showing an example of watching a display device with a parallel light type filter.

In FIG. 13 to FIG. 16, an example of an image separation filter according to the invention as the case with a parallel type optical system. FIG. 13 shows an example in which a light source 35 is disposed in proximity to a light converging point of third optical means 56 to provide parallel light passing through a display plane filter unit (a liquid crystal element 30) before being made converged in proximity to ahead of a watcher by fourth optical means. In this case, in order to increase utilization efficiency of light, the fourth optical means 66 is disposed. However, there can be no problem even though no fourth optical means 66 is provided.

Figure 14:
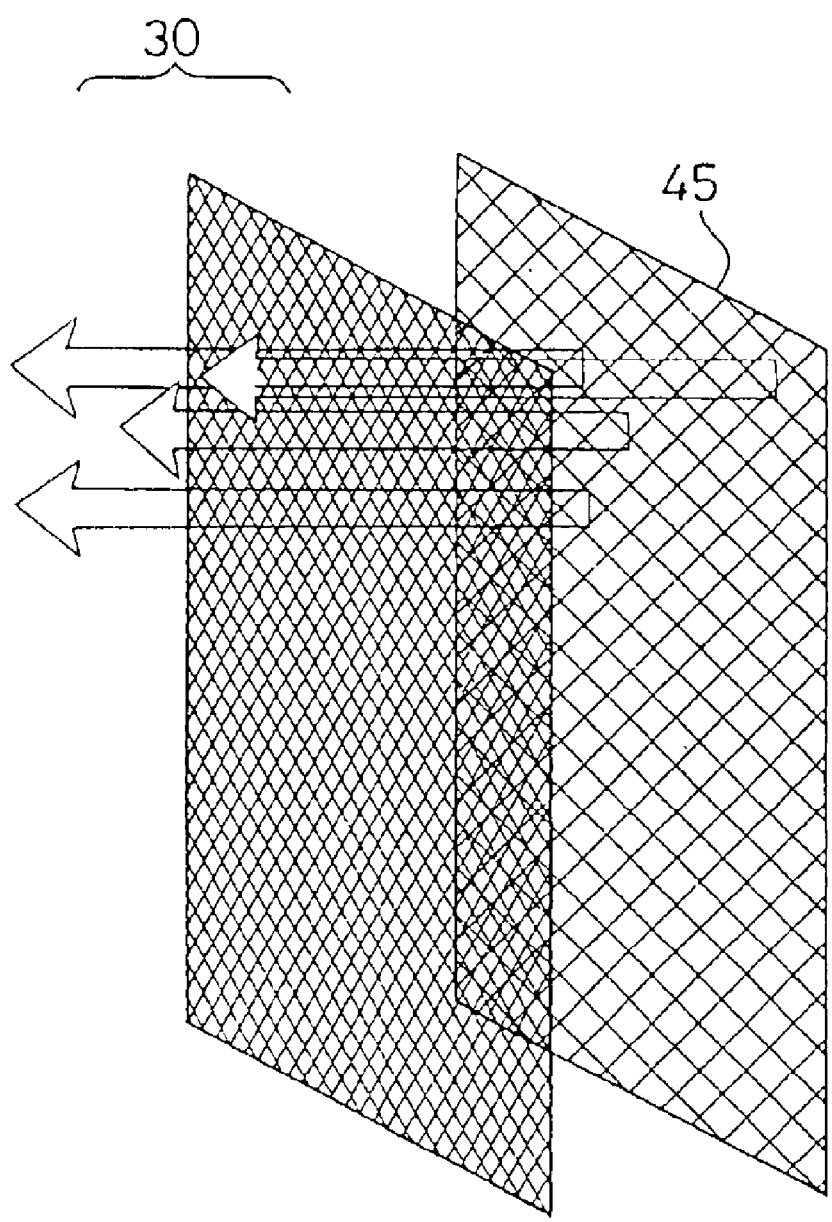
FIG. 14 presents another embodiment according to the invention with an explanatory diagram of a principal part showing relationships among a planer light source, a display plane, and a filter.
Figure 15:
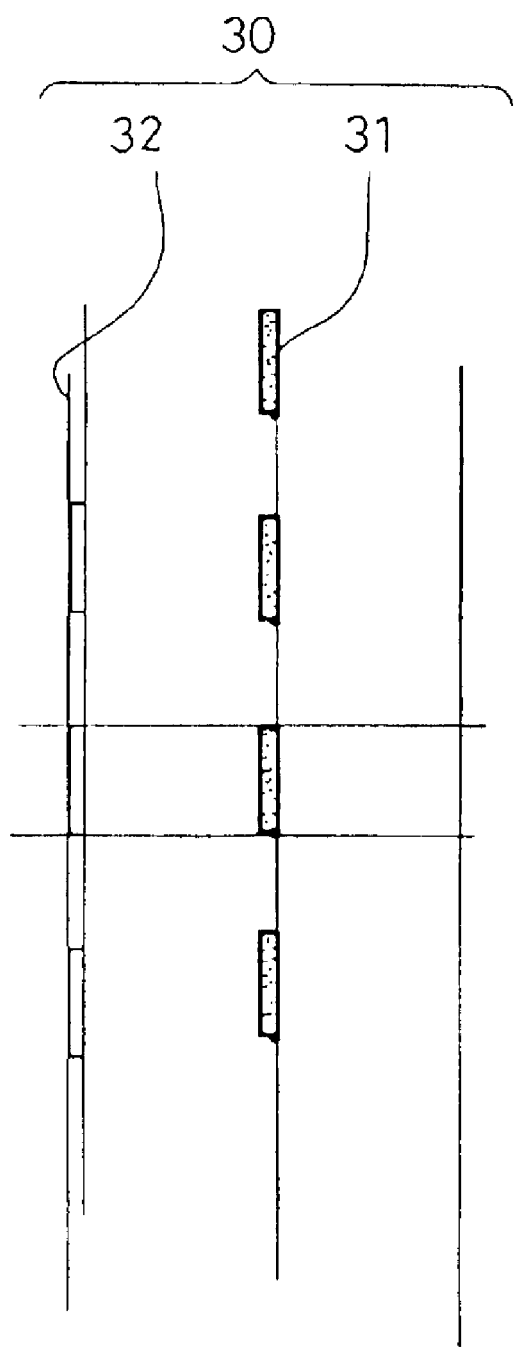
FIG. 15 presents another embodiment according to the invention with an explanatory diagram of a principal part showing an example of providing a front filter.
Figure 16:
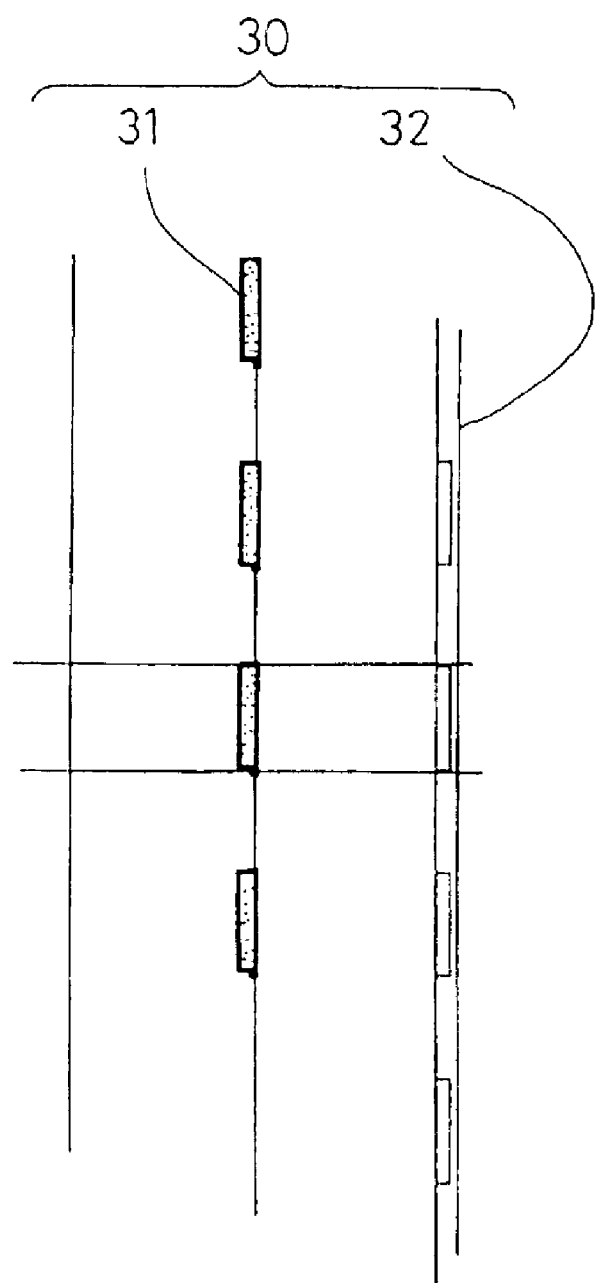
FIG. 16 presents another embodiment according to the invention with an explanatory diagram of a principal part showing an example of providing a rear filter.

FIG. 14 shows an example in which parallel light is emitted from a plane-like light source 45 in the vertical direction to a display plane filter unit (a liquid crystal display 30) and light passed through the display plane filter unit (parallel light) is watched. An arrangement of the image separation filter 32 in this case is, as shown in FIGS. 15 and 16, only requires the pixel 31 and the image separation filter 32 to have uniform widths and to be disposed at positions to which they are laterally shifted from the arrangement shown in FIG. 1 to FIG. 3 and FIG. 10 to FIG. 12. Moreover, when the light beam is provided as inclined parallel light, each of them is provided to have a uniform width, but required to be shifted by a shift from the pixel.

In the explanation of the above-described embodiments, the width of the first image regions of the pixel member 31 (the disposing interval of the second image regions) was taken as P2. However, it is not necessary to be limited to this, but calculation can be carried out with the width of the second image regions (the disposing interval of the first image regions) taken as P2.

Similarly, although the width of the first image separation mechanisms of the image separation filter 32 (the disposing interval between the second image separation mechanisms) was taken as P1 or P3, it is not necessary to be limited to this, but the width of the second image separation mechanism (the disposing interval between the first image separation mechanisms) can be taken as P1 or P3 to carry out calculation.

Furthermore, the embodiments in the method of designing the display device according to the invention is, by carrying out the method explained with reference to the above-explained FIG. 4 to FIG. 9 and presented as the above-described operation expressions, to dispose the first image separation mechanism in a region on a light beam passed through the first image region without the second image separation mechanism being disposed, and to dispose the second image separation mechanism in a region on a light beam passed through the second image region without the first image separation mechanism being disposed.

In addition, the arrangement of the display device according to the invention is provided with each of the elements explained with reference to FIG. 17 to FIG. 19. Namely, the first and second image separation mechanisms are linearly polarized light rays crossing at right angles to each other or circularly polarized light rays with directions thereof different from each other, or wavelengths different from each other such as red and blue etc.

Furthermore, the above-described first and second image separation mechanisms are arranged with linearly polarized light rays crossing at right angles to each other, half-wave plates, and the like.

Moreover, the above-described first and second image separation mechanisms are to be arranged with linearly polarized light rays crossing at right angles to each other and half-wave plates, in which, on the linearly polarizing plate on the side of an entrance face of light of the above-described display plane, each half-wave plate is provided on every other horizontal line, and on the side of the outgoing light, there is disposed the polarizing plate crossing at right angles to the side of the entrance face.

Further, the above-described first and second image separation mechanisms are provided with the half-wave plates each on every other horizontal line on the linearly polarizing plate on the side of an outgoing face of light, and watching is carried out through a polarizing plate with direction of polarization thereof crossing at right angles to that of the polarizing plate.

As described above, the display device according to the present invention can carryout the separation display without providing any image separation mechanism within the pixel without causing any crosstalk between the first image region and the second image region.

Moreover, image resolution is improved to allow to make it possible to enjoy a stereoscopic image without any crosstalk between the right and left images. Further, image resolution is improved to make it possible to enjoy views with a plurality of images without any crosstalk between the first and second images.

Furthermore, with the method of designing the display device according to the invention, a display device can be simply and easily designed which can carryout the separated display without providing any image separation mechanism within the pixel without causing any crosstalk between the first image region and the second image region.

In addition, quick and free design of the image separation filter of the display device becomes possible. Besides, image resolution is improved to make it possible to enjoy a stereoscopic image without any crosstalk between the right and left images. Further, image resolution is improved to make it possible to enjoy views with a plurality of images without any crosstalk between the first and second images.

INDUSTRIAL APPLICABILITY

The invention, being not limited to the above examples of embodiments, can be applied to display devices with other arrangements for displaying stereoscopic images with binocular disparities or displaying multi-views from one displayed image.

What is claimed is:

1. A display device having a transparent display element transmitting light projected from a light source to a watching point side, and comprising a pixel member formed with a first image region and a second image region, and an image separation filter separated from the pixel member by a specified region and formed with a first image separation mechanism and a second image separation mechanism, the display device characterized in that a disposing interval of each of said image separation mechanisms is determined by carrying out a calculation for obtaining the disposing interval on the basis of angle formed by a straight line connecting said watching point and an end point of the image region of said pixel member, with respect to a perpendicular line from the watching point to the display device, a thickness and a refractive index of said specified region, a length of said perpendicular line, and an interval of the image regions of said pixels.

2. The display device as claimed in claim 1 characterized in that
   said image separation filter is disposed between said watching point and said pixel member,
   a first transparent medium is disposed between said image separation filter and the pixel member, and
   the disposing interval P1 of each of said image separation mechanism of said image separation filter is determined by carrying out calculation of an operation expression of $$P1=P2-w1\{T/(n^2-t^2)^{1/2}-t/(n^2-t^2)^{1/2}\},$$

where P2, W1, n, t, and T are, respectively, an interval of the image regions of said pixel member, a thickness of said first transparent medium, a refractive index of said first transparent medium, a sine function of an angle of elevation to a vertical end line of a K-th (K represents an integer) pixel from said watching point, and a sine function of an angle of elevation to a vertical end line of a (K+1)-th (K represents an integer) pixel from said watching point.

3. The display device as claimed in claim 1 characterized in that
   said image separation filter is disposed between said light source and said pixel member,
   a second transparent medium is disposed between said image separation filter and the pixel member, and
   the disposing interval P3 of each of said image separation mechanisms of said image separation filter is determined by carrying out calculation of an operation expression of $$P3=P2+w2\{T/(n^2-t^2)^{1/2}-t/(n^2-t^2)^{1/2}\},$$

where P2, W2, n, t, and T are, respectively, an interval of the image region of said pixel member, a thickness of said second transparent medium, a refractive index of said second transparent medium, a sine function of an angle of elevation to a vertical end line of a K-th (K represents an integer) pixel from said watching point, and a sine function of angle of elevation to a vertical end line of a (K+1)-tb (K represents an integer) pixel from said watching point.

4. The display device as claimed in claim 1 characterized in that
   said transparent type display element is arranged so as to transmit light projected from the light source onto an illuminated plane disposed on said watching point side,
   said image separation filter is disposed between said light source and said pixel member,
   a second transparent medium is disposed between said image separation filter and the pixel member, and
   the disposing interval P1 of each of said image separation mechanis of said image separation filter is determined by carrying out calculation of an operation expression of $$P1=P2-w2\{T/(n^2-t^2)^{1/2}-t/(n^2-t^2)^{1/2}\},$$

where P2, W2, n, t, and T are, respectively, an interval between the image regions of said pixel member, a thickness of said second transparent medium, a refractive index of said second transparent medium, a sine function of an angle of elevation to a vertical end line of the K-th (K represents an integer) pixel from said watching point, and a sine function of angle of elevation to a vertical end line of the (K+1)-th (K represents an integer) pixel from said watching point, respectively.

5. The display device as claimed in claim 1 characterized in that
   said transparent type display element is arranged so as to transmit light projected from the light source onto an illuminated plane disposed on said watching point side,
   said image separation filter is disposed between said illuminated plane and said pixel member,
   a first transparent medium is disposed between said image separation filter and the pixel member, and
   the disposing interval P3 of each of said image separation mechanisms of said image separation filter is determined by carrying out calculation of an operation expression of $$P3=P2+w1\{T/(n^2-t^2)^{1/2}-t/(n^2-t^2)\},$$

where P2, W1, n, t, and T are, respectively, an interval of the image regions of said pixel member, a thickness of said first transparent medium, a refractive index of said first transparent medium, a sine function of an angle of elevation to a vertical end line of a K-th (K represents an integer) pixel from said watching point, and a sine function of an angle of elevation to a vertical end line of a (K+1)-th (K represents an integer) pixel from said watching point, respectively.

6. The display device as claimed in claim 1 characterized in that the first and second image separation mechanisms of said image separation filter are arranged to cause light to be polarized in directions of polarization different from each other.

7. The display device as claimed in claim 1 characterized in at the first and second image separation mechanisms of said image separation filter are wavelength filters different from each other.

8. The display device as claimed in claim 1 characterized in that said light source is arranged so that a wavelength of a light source for a left eye is different from a wavelength of a light source for a right eye.

9. A method of designing a display device having a transparent display element transmitting light projected from a light source to an watching point, and comprising a pixel member formed with a first image region and a second image region, and an image separation filter separated from the pixel member by a specified region and formed with a first image separation mechanism and a second image separation mechanism, the designing method characterized in that
   a disposing interval of each of said image separation mechanisms is determined by carrying out a calculation for obtaining the disposing interval on the basis of angle formed by a straight line connecting said watching point and an end point of the image region of said pixels, with respect to a perpendicular line from the watching point to the display device, a thickness and a refractive index of said specified region, a length of said perpendicular line, and an interval of the image regions of said pixel member.

10. The method of designing the display device as claimed in claim 9 characterized in that
    said image separation filter is disposed between said watching point and said pixel member,
    a first transparent medium is disposed between said image separation filter and the pixel member, and the disposing interval P1 of each of said image separation mechanisms of said image separation filter is determined by carrying out calculation of an operation expression of $$P1=P2-w1\{T/(n^2-t^2)^{1/2}-t/(n^2-t^2)^{1/2}\},$$

where P2, W1, n, t, and T are, respectively, an interval between the image regions of said pixels, a thickness of said first transparent medium, a refractive index of said first transparent medium, a sine function of an angle of elevation to a vertical end line of a K-th (K represents an integer) pixel from said watching point, and a sine function of an angle of elevation to a vertical end line of a (K+1)-th (K represents an integer) pixel from said watching point.

11. The method of designing the display device as claimed in claim 9 characterized in that said image separation filter is disposed between said light source and said pixel member, a second transparent medium is disposed between said image separation filter and the pixel member, and the disposing interval P3 of each of said image separation mechanisms of said image separation filter is determined by carrying out calculation of an operation expression of $$P3=P2+w2\{T/(n^2-t^2)^{1/2}-t/(n^2-t^2)^{1/2}\},$$

where P2, W2, n, t, and T are, respectively, an interval between the image regions of said pixel member, a thickness of said second transparent medium, a refractive index of said second transparent medium, a sine function of an angle of elevation to a vertical end line of a K-th (K represents an integer) pixel from said watching point, and a sine function of angle of elevation to a vertical end line of a (K+1)-th (K represents an integer) pixel from said watching point.

12. The method of designing the display device as claimed in claim 9 characterized in that said transparent display element is arranged so as to transmit light projected from the light source onto an illuminated plane disposed on said watching point side, said image separation filter is disposed between said light source and said pixel member, a second transparent medium is disposed between said image separation filter and the pixel member, and the disposing interval P1 of each of said image separation mechanisms of said image separation filter is determined by carrying out calculation of an operation expression of $$P1=P2-w2\{T/(n^2-t^2)^{1/2}-t/(n^2-t^2)^{1/2}\},$$

with P2, W2, n, t, and T are, respectively, an interval between the image regions of said pixel member, a thickness of said second transparent medium, a refractive index of said second transparent medium, a sine function of an angle of elevation to a vertical end line of a K-th (K represents an integer) pixel from said watching point, and a sine function of an angle of elevation to a vertical end line of a (K+1)-th (K represents an integer) pixel from said watching point, respectively.

13. The method of designing the display device as claimed in claim 9 characterized in that said transparent type display element is arranged so as to transmit light projected from the light source onto an illuminated plane disposed on said watching point side, said image separation filter is disposed between said illuminated plane and said pixel member, a first transparent medium is disposed between said image separation filter and the pixel member, and the disposing interval P3 of each of said image separation mechanism of said image separation filter is determined by carrying out calculation of an operation expression of $$P3=P2+w1\{T/(n^2-t^2)^{1/2}-t/(n^2-t^2)^{1/2}\},$$

with P2, W1, n, t, and T are, respectively, an interval between the image regions of said pixels, a thickness of said first transparent medium, a refractive index of said first transparent medium, a sine function of an angle of elevation to a vertical end line of a K-th (K represents an integer) pixel from said watching point, and a sine function of an angle of elevation to a vertical end line of a (K+1)-th (K represents an integer) pixel from said watching point.

* * * * *